US010338823B2

(12) United States Patent
Kottomtharayil et al.

(10) Patent No.: US 10,338,823 B2
(45) Date of Patent: *Jul. 2, 2019

(54) ARCHIVING USING DATA OBTAINED DURING BACKUP OF PRIMARY STORAGE

(71) Applicant: CommVault Systems, Inc., Tinton Falls, NJ (US)

(72) Inventors: Rajiv Kottomtharayil, Marlboro, NJ (US); Paramasivam Kumarasamy, Morganville, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,817

(22) Filed: Jul. 31, 2017

(65) Prior Publication Data

US 2018/0018236 A1  Jan. 18, 2018

Related U.S. Application Data

(63) Continuation of application No. 13/924,217, filed on Jun. 21, 2013, now Pat. No. 9,747,169.

(Continued)

(51) Int. Cl.
*G06F 11/14* (2006.01)
*G06F 11/20* (2006.01)
*G06F 3/06* (2006.01)

(52) U.S. Cl.
CPC .......... *G06F 3/0613* (2013.01); *G06F 3/0649* (2013.01); *G06F 3/0685* (2013.01); *G06F 11/1458* (2013.01); *G06F 11/2058* (2013.01); *G06F 11/2094* (2013.01); *G06F 11/2097* (2013.01); *G06F 2201/84* (2013.01)

(58) Field of Classification Search
CPC ................................................. G06F 17/30073
See application file for complete search history.

(56) References Cited

U.S. PATENT DOCUMENTS 4,084,231 A   4/1978   Capozzi et al.
4,267,568 A   5/1981   Dechant et al.
(Continued)

FOREIGN PATENT DOCUMENTS

EP   0259912   3/1988
EP   0405926   1/1991
(Continued)

OTHER PUBLICATIONS

How FAT Works (Microsoft, available at https://technet.microsoft.com/en-us/library/cc776720(v=ws.10).aspx) (Year: 2003).*

(Continued)

*Primary Examiner* — Reginald G Bragdon
*Assistant Examiner* — Paul M Knight
(74) *Attorney, Agent, or Firm* — Knobbe Martens Olson & Bear, LLP

(57) ABSTRACT

A data storage system can scan one or more information stores of primary storage and analyze the metadata of files stored in the one or more information stores of primary storage to identify multiple, possibly relevant, secondary copy operations that can be performed on the files. The storage system can also identify primary storage usage information of each file during the scan and use that information to generate reports regarding the usage of the primary storage.

20 Claims, 13 Drawing Sheets

Related U.S. Application Data

(60) Provisional application No. 61/740,774, filed on Dec. 21, 2012, provisional application No. 61/759,291, filed on Jan. 31, 2013.

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,560,615 B1* | 5/2003 | Zayas | G06F 11/1451 707/646 |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 6,785,786 B1* | 8/2004 | Gold | G06F 11/1461 711/162 |
| 7,003,641 B2 | 2/2006 | Prahlad et al. | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,165,059 B1* | 1/2007 | Shah | G06F 3/0605 |
| 7,174,433 B2 | 2/2007 | Kottomtharayil et al. | |
| 7,246,140 B2* | 7/2007 | Therrien | G06F 11/1448 |
| 7,246,207 B2 | 7/2007 | Kottomtharayil et al. | |
| 7,266,574 B1* | 9/2007 | Boudrie | G06F 11/1451 707/646 |
| 7,315,923 B2 | 1/2008 | Retnamma et al. | |
| 7,343,453 B2 | 3/2008 | Prahlad et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,441,153 B1* | 10/2008 | Chitre | G06F 21/64 714/38.14 |
| 7,454,569 B2 | 11/2008 | Kavuri et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,747,579 B2 | 6/2010 | Prahlad et al. | |
| 7,801,864 B2 | 9/2010 | Prahlad et al. | |
| 7,809,914 B2 | 10/2010 | Kottomtharayil et al. | |
| 7,899,795 B1* | 3/2011 | Kahn | G06F 11/0727 707/690 |
| 8,015,158 B1* | 9/2011 | Mankovsky | G06F 11/1435 707/648 |
| 8,099,391 B1* | 1/2012 | Monckton | G06F 11/1451 707/647 |
| 8,170,995 B2 | 5/2012 | Prahlad et al. | |
| 8,229,954 B2 | 7/2012 | Kottomtharayil et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,463,798 B1* | 6/2013 | Claudatos | G06F 17/30144 707/752 |
| 8,578,120 B2 | 11/2013 | Attarde et al. | |
| 9,747,169 B2 | 8/2017 | Kottomtharayil et al. | |
| 2005/0131853 A1* | 6/2005 | Sampath | G06F 11/1471 |
| 2005/0240625 A1* | 10/2005 | Chang | G06Q 10/08 |
| 2005/0267922 A1* | 12/2005 | Nakajima | G06F 17/30244 |
| 2006/0053261 A1* | 3/2006 | Prahlad | G06F 3/0605 711/162 |
| 2006/0224846 A1 | 10/2006 | Amarendran et al. | |
| 2007/0130232 A1* | 6/2007 | Therrien | G06F 8/71 |
| 2008/0115071 A1* | 5/2008 | Fair | G06F 11/1451 715/764 |
| 2008/0117752 A1* | 5/2008 | Kishimoto | G11B 20/10009 369/47.15 |
| 2008/0147754 A1* | 6/2008 | Littlefield | G06F 17/302 |
| 2008/0155319 A1* | 6/2008 | Duncan | G06F 11/1448 714/13 |
| 2008/0195677 A1* | 8/2008 | Sudhakar | G06F 17/3023 |
| 2008/0313236 A1* | 12/2008 | Vijayakumar | G06F 17/30091 |
| 2009/0013138 A1* | 1/2009 | Sudhakar | G06F 11/1435 711/162 |
| 2009/0043828 A1* | 2/2009 | Shitomi | G06F 17/30221 |
| 2009/0063794 A1* | 3/2009 | Green | G06F 11/1461 711/162 |
| 2009/0182791 A1* | 7/2009 | Gorobets | G06F 12/0246 |
| 2009/0249005 A1* | 10/2009 | Bender | G06F 11/1435 711/162 |
| 2009/0287684 A1* | 11/2009 | Bennett | G06F 17/3089 |
| 2009/0319534 A1 | 12/2009 | Gokhale | |
| 2010/0257140 A1* | 10/2010 | Davis | G06F 17/30073 707/661 |
| 2010/0318500 A1* | 12/2010 | Murphy | G06F 11/1451 707/693 |
| 2011/0246416 A1* | 10/2011 | Prahlad | G06F 17/30156 707/610 |
| 2011/0246427 A1* | 10/2011 | Modak | G06F 11/1469 707/653 |
| 2011/0320690 A1* | 12/2011 | Petersen | G06F 3/0611 711/103 |
| 2012/0047112 A1* | 2/2012 | Steffan | G06F 17/30011 707/662 |
| 2012/0124007 A1* | 5/2012 | Sten | G06F 11/1448 707/685 |
| 2012/0150818 A1 | 6/2012 | Vijayan Retnamma et al. | |
| 2012/0150826 A1 | 6/2012 | Vijayan Retnamma et al. | |
| 2013/0132942 A1* | 5/2013 | Wang | G06F 8/61 717/176 |
| 2014/0074790 A1* | 3/2014 | Berman | G06F 17/3007 707/649 |
| 2014/0108456 A1* | 4/2014 | Ramachandrula | G06K 9/00449 707/779 |
| 2014/0181441 A1 | 6/2014 | Kottomtharayil et al. | |
| 2014/0181443 A1 | 6/2014 | Kottomtharayil et al. | |

FOREIGN PATENT DOCUMENTS

| | | |
|---|---|---|
| EP | 0467546 | 1/1992 |
| EP | 0541281 | 5/1993 |
| EP | 0774715 | 5/1997 |

(56) References Cited

FOREIGN PATENT DOCUMENTS

| | | |
|---|---|---|
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Arneson, "Mass Storage Archiving in Network Environments" IEEE, Oct. 31-Nov. 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

\* cited by examiner

ARCHIVING USING DATA OBTAINED DURING BACKUP OF PRIMARY STORAGE

CROSS-REFERENCE TO RELATED APPLICATIONS

This application is a continuation of U.S. patent application Ser. No. 13/924,217, filed on Jun. 21, 2013, entitled REPORTING USING DATA OBTAINED DURING BACKUP OF PRIMARY STORAGE, which claims priority benefit to U.S. Provisional Application No. 61/740,774 entitled IDENTIFYING FILES FOR MULTIPLE SECONDARY COPY OPERATIONS DURING A SCAN OF PRIMARY STORAGE, filed Dec. 21, 2012 and U.S. Provisional Application No. 61/759,291 entitled IDENTIFYING FILES FOR MULTIPLE SECONDARY COPY OPERATIONS DURING A SCAN OF PRIMARY STORAGE, filed Jan. 31, 2013 and, each of which is hereby incorporated by reference herein in its entirety. Any and all applications for which a foreign or domestic priority claim is identified in the Application Data Sheet as filed with the present application are incorporated by reference under 37 CFR 1.57 and made a part of this specification.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

In addition to backing up files, a company might also archive files to comply with reporting and legal requirements. IT departments within a company may also generate reports of storage systems to identify usage and trending details. Such reports can be used to determine if additional storage is needed, etc.

Often data in a primary storage device is scanned multiple times by a storage management system to identify different pieces of information regarding the usage of the primary storage device and the files stored thereon. For example, a primary storage device is often scanned a first time to identify the files that should be backed up according to a backup storage policy. Following the first scan, the storage management system can perform a backup of the identified files. At a later point in time, the data in the primary storage device is then scanned a second time to identify any files that should be archived. Following the second scan, the storage management system archives the identified files. The primary storage device can be scanned a third time to identify usage information or other information not collected during the backup or the archive scans, such as the amount of used storage space vs. available storage space, the number of mount points, the number of volumes, types of disks used for storage, disk trending, fault trending, etc. Following the third scan, the storage management system can generate various reports based on the usage information, such as the rate at which storage space is being used, etc.

The backup, archive, and reporting operations can be very time consuming, as each operation scans the storage system for different information. Further, the amount of time needed to complete the various scans and operations can exceed the time allocated by a system administrator.

SUMMARY

A data storage system according to certain embodiments, during a single scanning session, scans one or more information stores of primary storage and analyzes the metadata associated with files located in the one or more information stores of primary storage to identify multiple, secondary copy operations that can be performed on the files. For instance, the system may scan primary storage to identify files to perform a backup copy operation on and, during the same scanning session, identify files to perform an archive operation on. Files can be scanned in a variety of manners. In some embodiments, the storage system scans a file to identify one or more, secondary copy operations that can be performed on that file before analyzing another file. In other cases, one or more of the files are scanned in parallel. The storage system can also identify primary storage usage information of each file during the scan session to generate reports regarding the usage of the primary storage. The reports may include information not typically obtained during a scan associated with a backup or archive operation, for example. Consolidating scanning and/or associated secondary copy operations in this manner significantly reduces scanning time, increasing system performance.

DETAILED DESCRIPTION

Figure 1A:
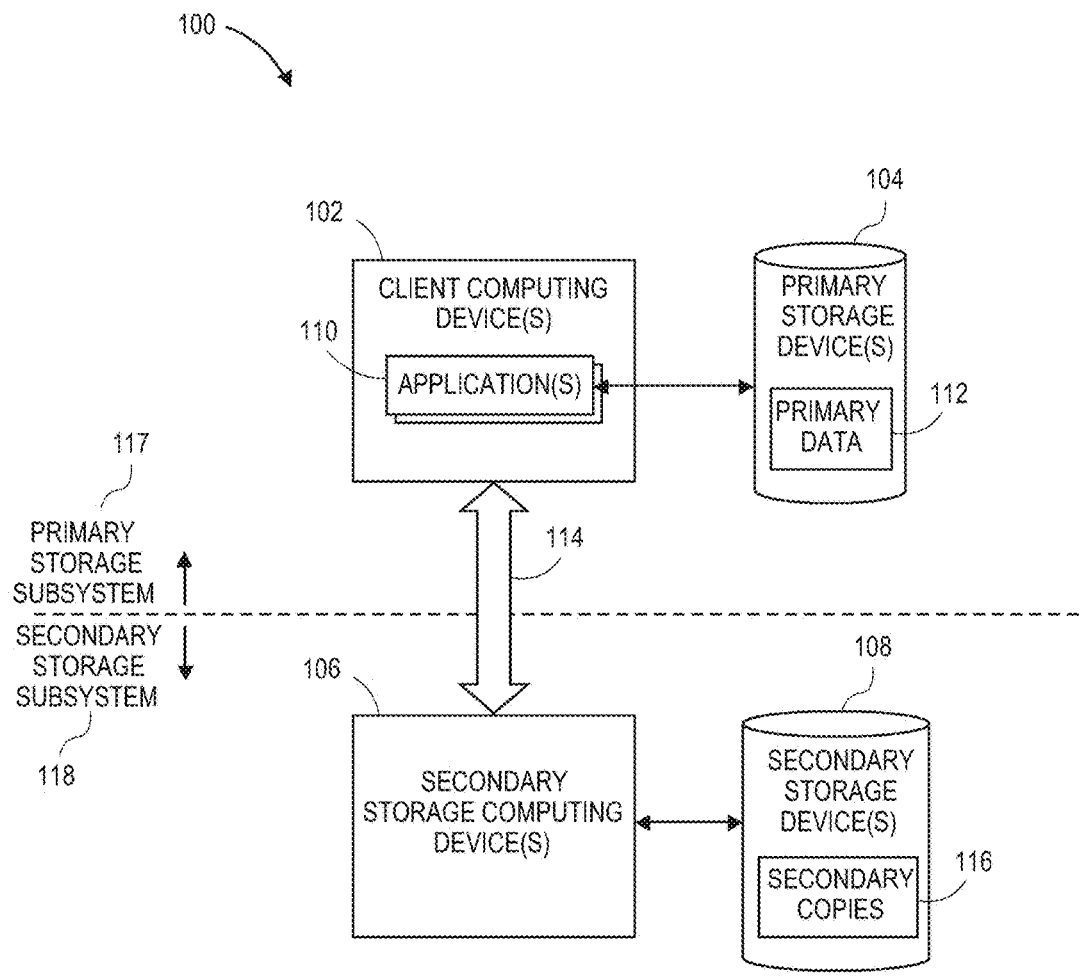
FIG. 1A is a block diagram illustrating an exemplary information management system.

Generally described, the present disclosure is directed to a system, method, and computer readable non-transitory storage medium for a storage management system. Specifically, embodiments described herein include systems and methods for analyzing files in a primary storage device once and performing one of a variety of storage operations on the files based on the single analysis.

In accordance with certain aspects of the disclosure, the storage management system can scan one or more information stores of primary storage once and analyze the files stored thereon to determine which files should be part of different secondary copy operations, such as a backup operation or archive operation. During the scan, the storage management system can also retrieve storage information associated with the files, which can be used to identify usage information of the primary storage. In some embodiments, the storage management system analyzes each file (e.g., metadata associated with the file) individually and collects information associated with the file relating to each of the different secondary copy operations. The files can be analyzed serially, such that analysis for one file is completed before analyzing another file, or one or more of the files can be analyzed in parallel (e.g., via different threads). For example, the storage management system can determine whether the file currently being analyzed should be part of a backup operation or an archive operation. In addition, the storage management system can retrieve storage information of the file currently being analyzed before analyzing another file, or in parallel with analysis of one or more other files, depending on the embodiment. The storage information can include, but is not limited to, the amount of data used to store the file, the volume where the file is stored, the type of disk used to store the file, any faults relevant to the file, etc.

In addition, as part of the scan, the storage management system can perform the relevant system operations and/or secondary copy operations on the files. For example, files identified for a backup operation can be backed up, files identified for archive can be archived, and the usage information of each filed can be used to generate reports. As part of the backup operation, all of the files can be backed up, a subset of the files can be backed up (e.g., files changed since a last backup), and/or changes to the files that have occurred since a previous backup can be backed up. As part of the archive operation, the files identified for archive can be removed from the one or more information stores and, depending on the type of archive operation, can also be replaced with a stub that includes information as to where the file can be found in a secondary storage and/or in an archive storage device.

In some cases, the storage management system can perform the storage operations on the file currently being analyzed before proceeding to another file. For example, if the file currently being analyzed is to be part of a backup, the storage management system can begin the backup operation on the file before analyzing another file. Similarly, if the file currently being analyzed is to be archived, the storage management system can copy the file from either the one or more information stores of primary storage or secondary storage to an archive storage device and replace the file in the primary storage with a stub that includes information on how to retrieve the file from secondary storage or the archive storage device, before analyzing another file. In other cases, analysis and/or storage operations are performed on one or more files in parallel.

In certain cases, the storage management system can wait until all of the files of the primary storage have been analyzed before beginning the secondary copy operations. For example, once the storage management system has scanned the one or more information stores of the primary storage and identified the files for backup, the files for archive, and/or the primary storage usage information, the storage management device can begin the backup operation on the files identified for backup, the archive operations for the files identified for archive, and/or generate reports based on the usage information. In other cases, the scanning/analysis at least partially overlaps in time with the storage operation(s) and/or report generation.

In addition, the storage management system can compile the usage information that was collected during the scan for each individual file while concurrently scanning the file for secondary copy operations. The compiled usage information can be used to generate reports regarding the primary storage. As mentioned previously, the reports can include usage information of the primary storage, such as the amount of used storage space vs. available storage space in the primary storage, the number of mount points of the primary storage, the number of volumes in the primary storage, types of disks used for storage in the primary storage, usage trends, such as the rate at which data is being used, fault trending, etc. Collecting this information during the scan associated with the secondary copy operation (e.g., backup or archive) results in significant time savings.

Further examples of systems and methods for analyzing primary storage and identifying files for different secondary copy operations during a scan are shown and described below with respect to FIGS. 2-7, for example. By analyzing each file once to identify multiple, secondary copy operations and information during one scan of the primary storage, the storage management system can reduce the time required to perform the secondary copy operations and the down time of the primary storage device.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";
- U.S. Pat. No. 8,307,177, entitled "SYSTEMS AND METHODS FOR MANAGEMENT OF VIRTUALIZATION DATA"
- U.S. Pat. No. 7,035,880, entitled "MODULAR BACKUP AND RETRIEVAL SYSTEM USED IN CONJUNCTION WITH A STORAGE AREA NETWORK";
- U.S. Pat. No. 7,343,453, entitled "HIERARCHICAL SYSTEMS AND METHODS FOR PROVIDING A UNIFIED VIEW OF STORAGE INFORMATION";
- U.S. Pat. No. 7,395,282, entitled "HIERARCHICAL BACKUP AND RETRIEVAL SYSTEM";
- U.S. Pat. No. 7,246,207, entitled "SYSTEM AND METHOD FOR DYNAMICALLY PERFORMING STORAGE OPERATIONS IN A COMPUTER NETWORK";
- U.S. Pat. No. 7,747,579, entitled "METABASE FOR FACILITATING DATA CLASSIFICATION";
- U.S. Pat. No. 8,229,954, entitled "MANAGING COPIES OF DATA";
- U.S. Pat. No. 7,617,262, entitled "SYSTEM AND METHODS FOR MONITORING APPLICATION DATA IN A DATA REPLICATION SYSTEM";
- U.S. Pat. No. 7,529,782, entitled "SYSTEM AND METHODS FOR PERFORMING A SNAPSHOT AND FOR RESTORING DATA";
- U.S. Pat. No. 8,230,195, entitled "SYSTEM AND METHOD FOR PERFORMING AUXILIARY STORAGE OPERATIONS";
- U.S. Pat. No. 7,315,923, entitled "SYSTEM AND METHOD FOR COMBINING DATA STREAMS IN A STORAGE OPERATION";
- U.S. Pat. No. 8,364,652, entitled "CONTENT-ALIGNED, BLOCK-BASED DEDUPLICATION";
- U.S. Pat. Pub. No. 2006/0224846, entitled "SYSTEM AND METHOD TO SUPPORT SINGLE INSTANCE STORAGE OPERATIONS";
- U.S. Pat. Pub. No. 2010-0299490, entitled "BLOCK-LEVEL SINGLE INSTANCING";
- U.S. Pat. Pub. No. 2009/0329534, entitled "APPLICATION-AWARE AND REMOTE SINGLE INSTANCE DATA MANAGEMENT";
- U.S. Pat. Pub. No. 2012/0150826, entitled "DISTRIBUTED DEDUPLICATED STORAGE SYSTEM";
- U.S. Pat. Pub. No. 2012/0150818, entitled "CLIENT-SIDE REPOSITORY IN A NETWORKED DEDUPLICATED STORAGE SYSTEM";
- U.S. Pat. No. 8,170,995, entitled "METHOD AND SYSTEM FOR OFFLINE INDEXING OF CONTENT AND CLASSIFYING STORED DATA"; and
- U.S. Pat. No. 8,156,086, entitled "SYSTEMS AND METHODS FOR STORED DATA VERIFICATION".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical virtual machine host operated by the organization. As one example, the organization may use one virtual machine as a database server and another virtual or physical machine as a mail server. A virtual machine manager (VMM) (e.g., a Hypervisor) may manage the virtual machines, and reside and execute on the virtual machine host. Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system residing on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses & handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP SPAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any of the computing devices described above, without limitation In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
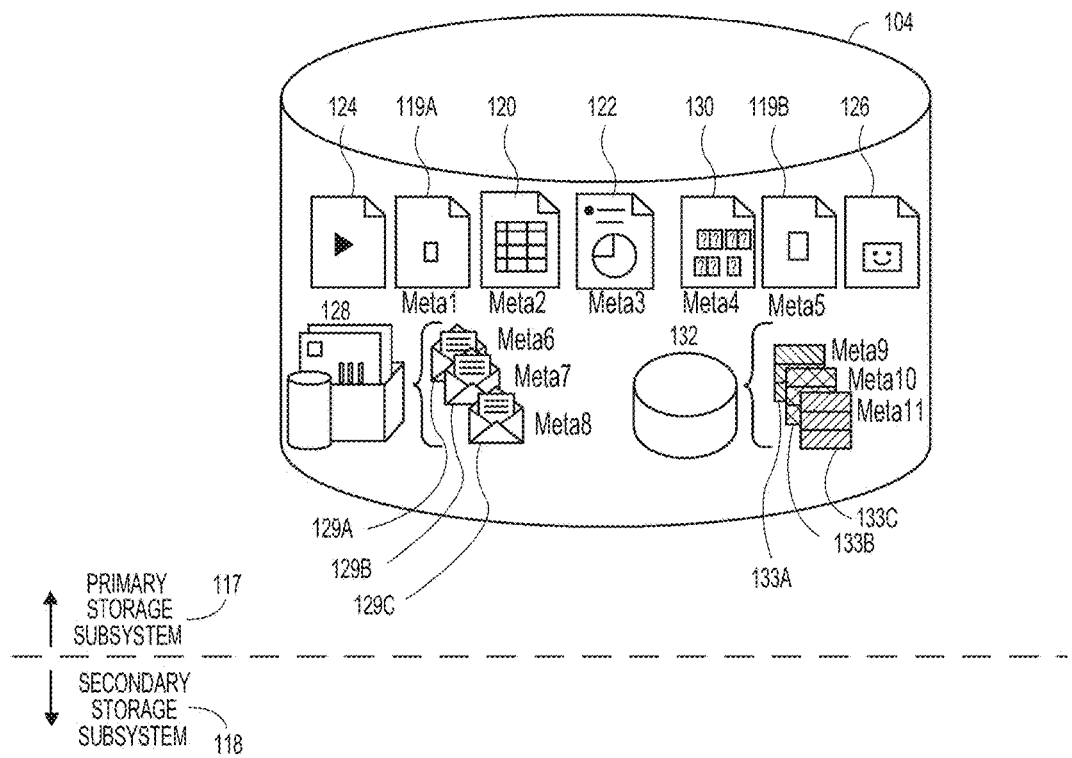
FIG. 1B is a detailed view of a primary storage device, a secondary storage device, and some examples of primary data and secondary copy data.
Figure 1B:
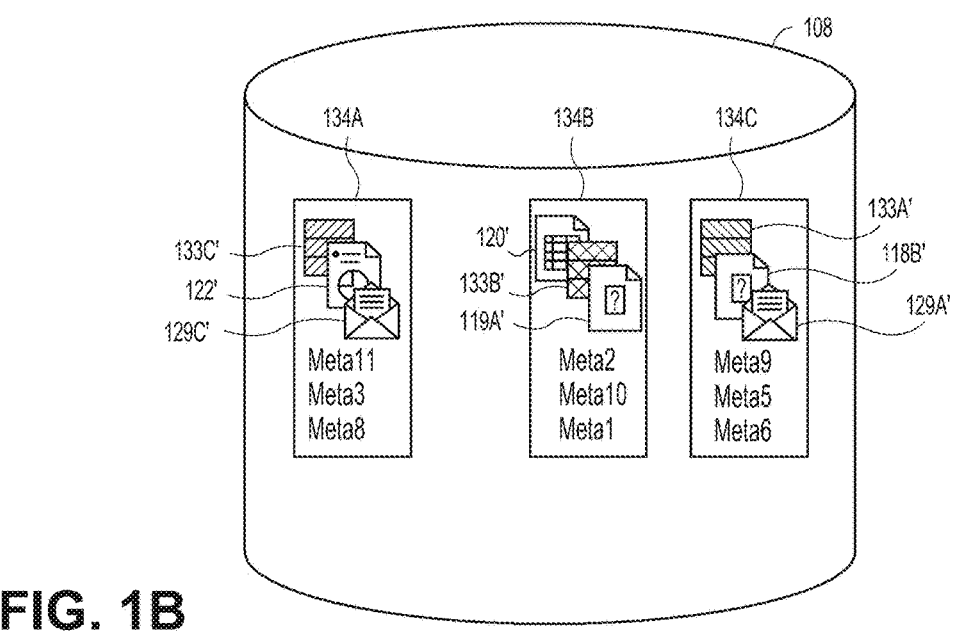

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Metal-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
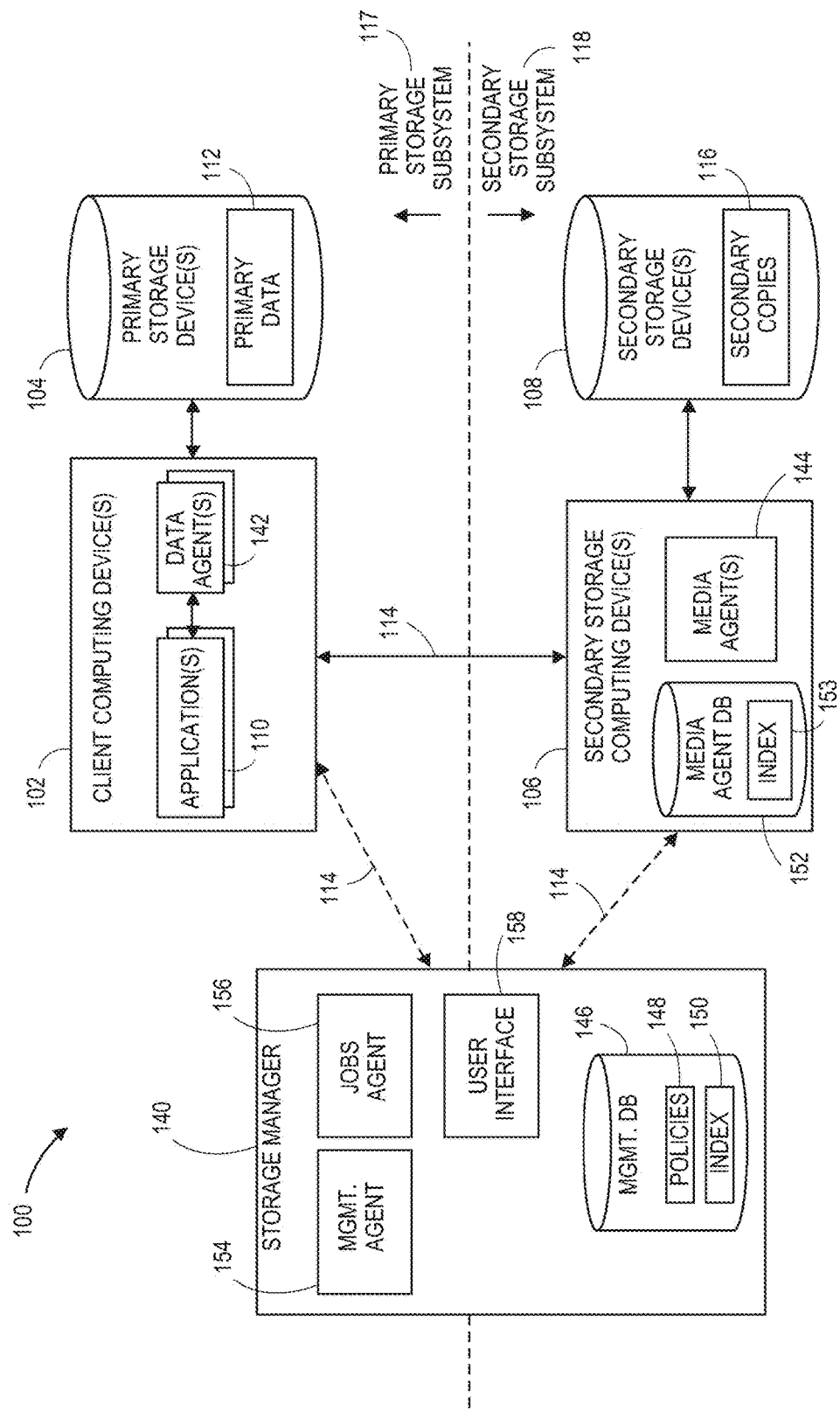
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager is implemented on a separate computing device.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application. The storage manager generally initiates, performs, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and payload metadata is generally communicated between the data agents 142 and the media agents 144 (or otherwise between the client computing device(s) 102 and the secondary storage computing device(s) 106), e.g., at the direction of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:

initiating execution of secondary copy operations;

managing secondary storage devices 108 and inventory/capacity of the same;

reporting, searching, and/or classification of data in the information management system 100;

allocating secondary storage devices 108 for secondary storage operations;

monitoring completion of and providing status reporting related to secondary storage operations;

tracking age information relating to secondary copies 116, secondary storage devices 108, and comparing the age information against retention guidelines;

tracking movement of data within the information management system 100;

tracking logical associations between components in the information management system 100;

protecting metadata associated with the information management system 100; and implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the storage manager index 150 may store data associating a client computing device 102 with a particular media agent 144 and/or secondary storage device 108, as specified in a storage policy.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

The storage manager 140 may also track information that permits it to select, designate, or otherwise identify content indices, deduplication databases, or similar databases or resources or data sets within its information management "cell" (or another cell) to be searched in response to certain queries. Such queries may be entered by the user via interaction with the user interface 158. An information management cell may generally include a logical and/or physical grouping of a combination of hardware and software components associated with performing information management operations on electronic data. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of storage operation cells. Cells may also be delineated and/or organized hierarchically according to function, geography, architectural considerations, or other factors useful or desirable in performing information management operations. A first cell may represent a geographic segment of an enterprise, such as a Chicago office, and a second storage operation cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

In general, the management agent 154 allows multiple information management cells 100 to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs.

Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access data stored on the secondary storage devices 108, whether it be for the purposes of reading, writing, modifying, or deleting data. Moreover, as will be described further, media agents 144 can generate and store data and metadata data that generally provides insight into the data stored on associated secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 104.

While media agent(s) 144 are generally associated with one or more secondary storage devices 108, one or more media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

Where the information management system 100 includes multiple media agents 144 (FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
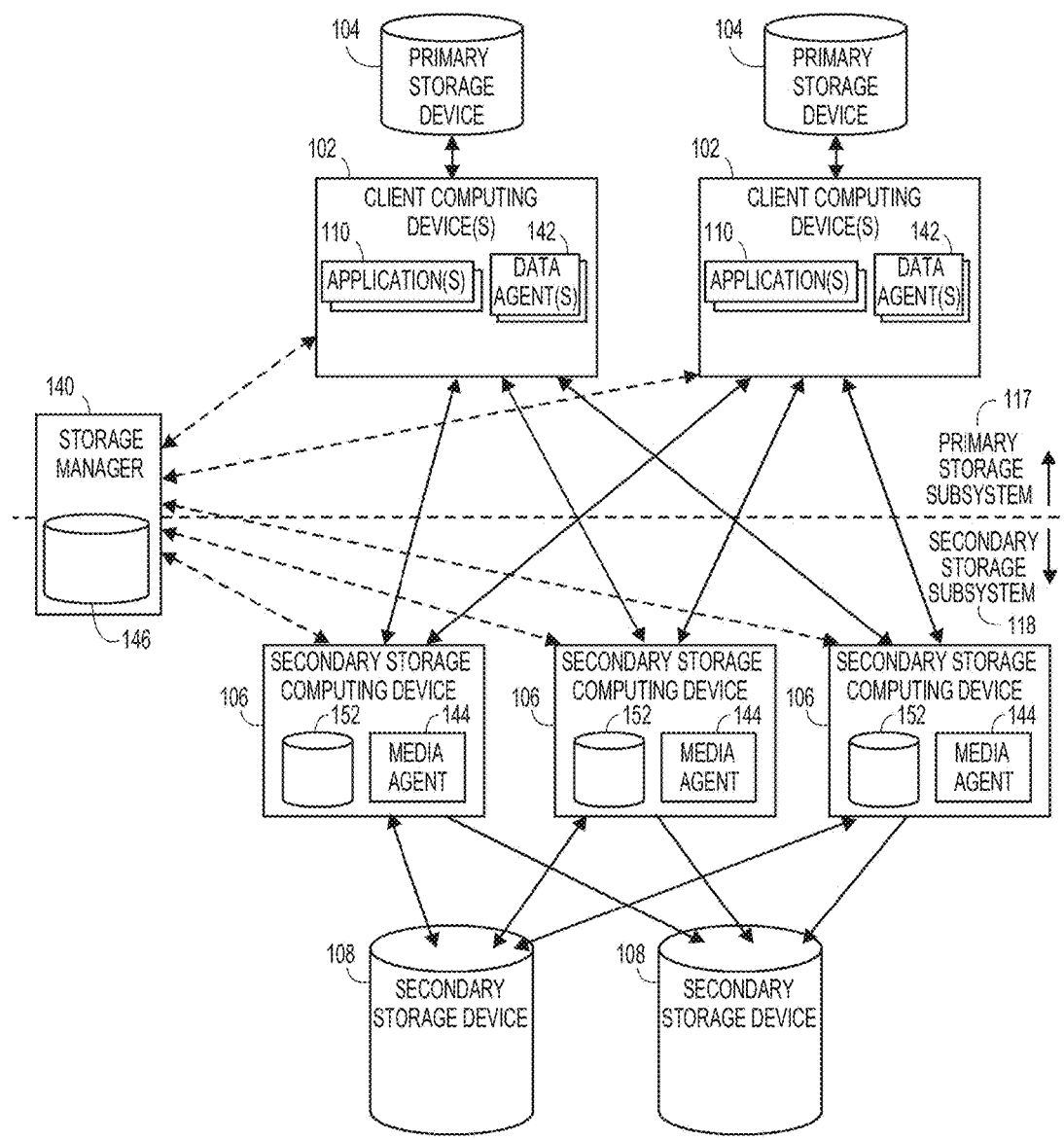
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files at the file-level, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, entitled "SYSTEM AND METHOD FOR ARCHIVING OBJECTS IN AN INFORMATION STORE", which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware" snapshot operation can be a snapshot operation where a target storage device (e.g., a primary storage device 104 or a secondary storage device 108) performs the snapshot operation in a self-contained fashion, substantially independently, using hardware, firmware and/ or software residing on the storage device itself. For instance, the storage device may be capable of performing snapshot operations upon request, generally without intervention or oversight from any of the other components in the information management system 100. In this manner, using hardware snapshots can off-load processing involved in creating and management from other components in the system 100.

A "software" snapshot operation, on the other hand, can be a snapshot operation in which one or more other components in the system (e.g., the client computing devices 102, media agents 104, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. In some other cases, the snapshot may created at the block-level, such as where creation of the snapshot occurs without awareness of the file system. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 100 may calculate and/or store signatures (e.g., hashes) corresponding to the individual data blocks in a database and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 (or other source storage device, such as a secondary storage device 108) to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112.

Examples of compatible content indexing techniques are provided in U.S. Pat. No. 8,170,995, which is incorporated by reference herein.

In order to leverage the data stored in the information management system 100 to perform these and other tasks, one or more components can be configured to scan data and/or associated metadata for classification purposes to populate a database of information (which can be referred to as a "metabase"). Such scanned, classified data and/or metadata may be included in a separate database and/or on a separate storage device from primary data 112 (and/or secondary copies 116), such that operations related to the database do not significantly impact performance on other components in the information management system 100.

In other cases, the database(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, entitled "HIERARCHICAL SYSTEMS AND METHODS FOR PROVIDING A UNIFIED VIEW OF STORAGE INFORMATION", which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

As an example, a storage manager 140 or other component in the information management system 100 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of a set of associated storage operation cells in a hierarchy of information management cells, such as the status of jobs, system components, system resources, and other items, by communicating with storage managers 140 (or other components) in the respective storage operation cats. Moreover, the master storage manager 140 may track the status of its associated storage operation cells and associated information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies a particular storage criteria and, if so, perform an action. For example, as previously described, a storage policy or other definition might indicate that a storage manager 140 should initiate a particular action if a storage metric or other indication drops below or otherwise fails to satisfy a specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like)

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of copy 116 (e.g., type of secondary copy) and/or copy (e.g., type of secondary copy) format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
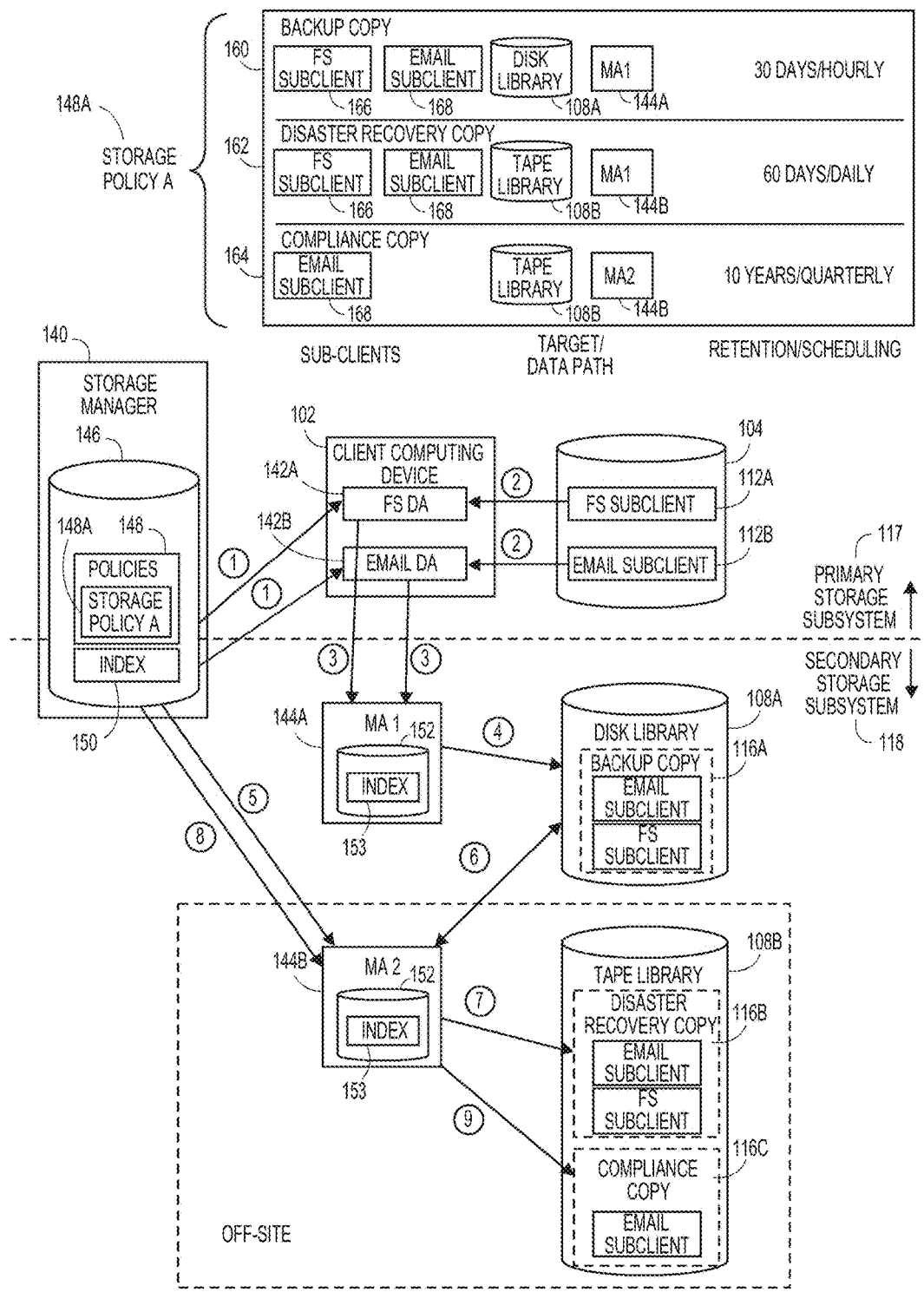
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences or rule set 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and U.S. Pat. Pub. No. 2010-0299490, each of which is incorporated by reference herein.

Figure 1F:
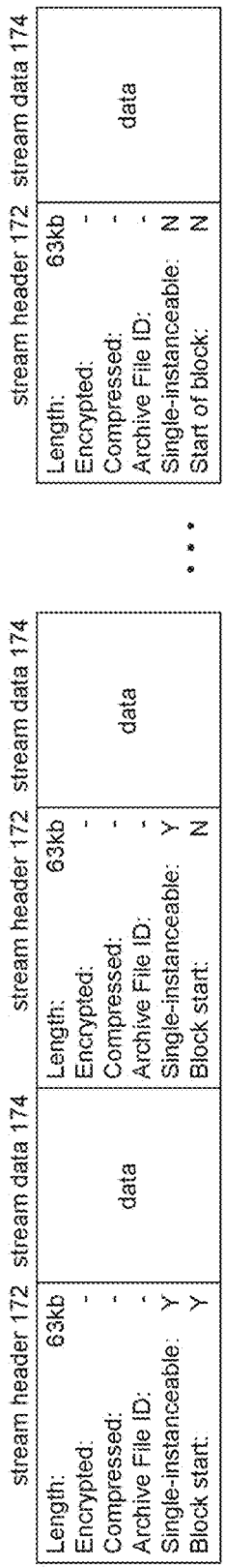
FIGS. 1F-1H are block diagrams illustrating suitable data structures that may be employed by the information management system.
Figure 1G:
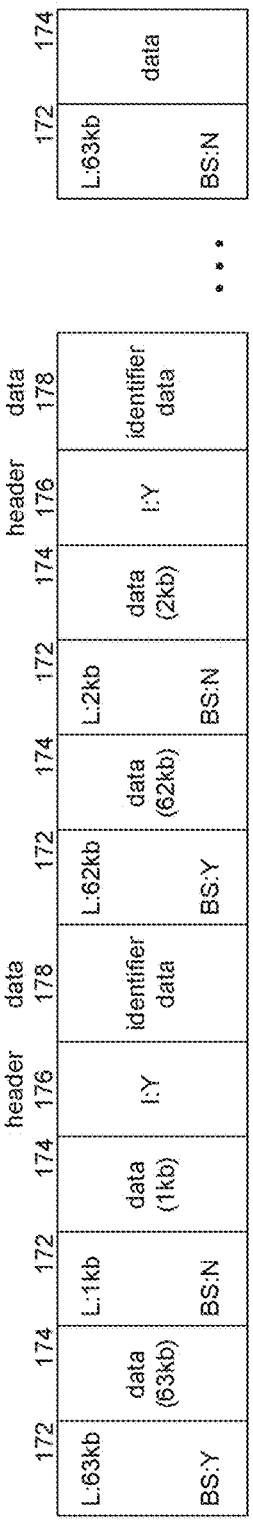

FIGS. 1F and 1G are diagrams of example data streams 170 and 171, respectively, that may be employed for performing data storage operations. Referring to FIG. 1F, the data agent 142 forms the data stream 170 from the data associated with a client 102 (e.g., primary data 112). The data stream 170 is composed of multiple pairs of stream header 172 and stream payload 174. The data streams 170 and 171 shown in the illustrated example are for a single-instanced storage operation, and a stream payload 174 therefore includes both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 Kb. The first two stream header 172 and stream payload 174 pairs comprise a first data block of size 64 Kb. The first stream header 172 indicates that the length of the succeeding stream payload 174 is 63 Kb and that it is the start of a data block. The next stream header 172 indicates that the succeeding stream payload 174 has a length of 1 Kb and that it is not the start of a new data block. Immediately following stream payload 174 are an identifier header 176 and identifier data 178 pair. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
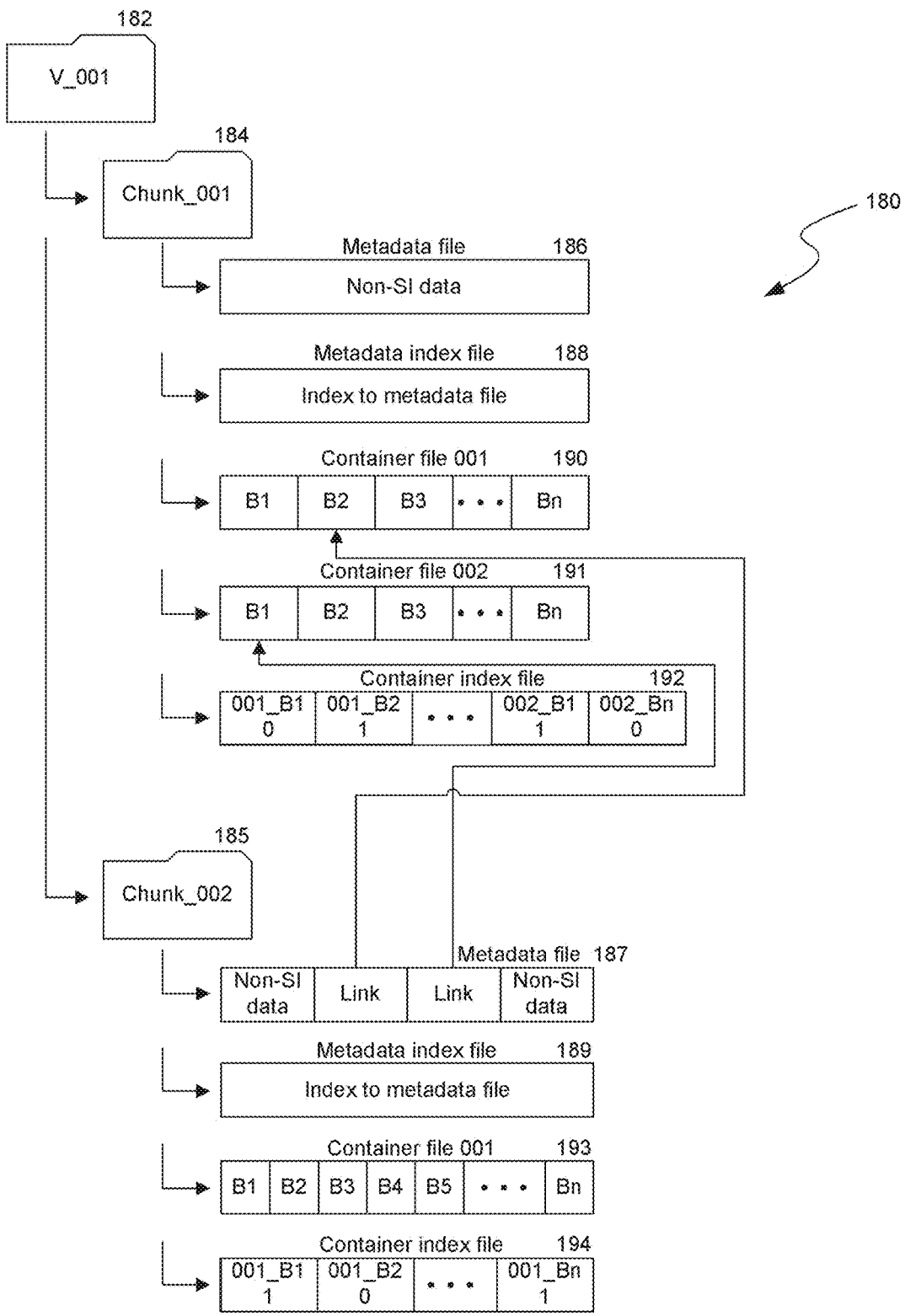

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within a volume folder 182, and multiple files within a chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

Figure 7:
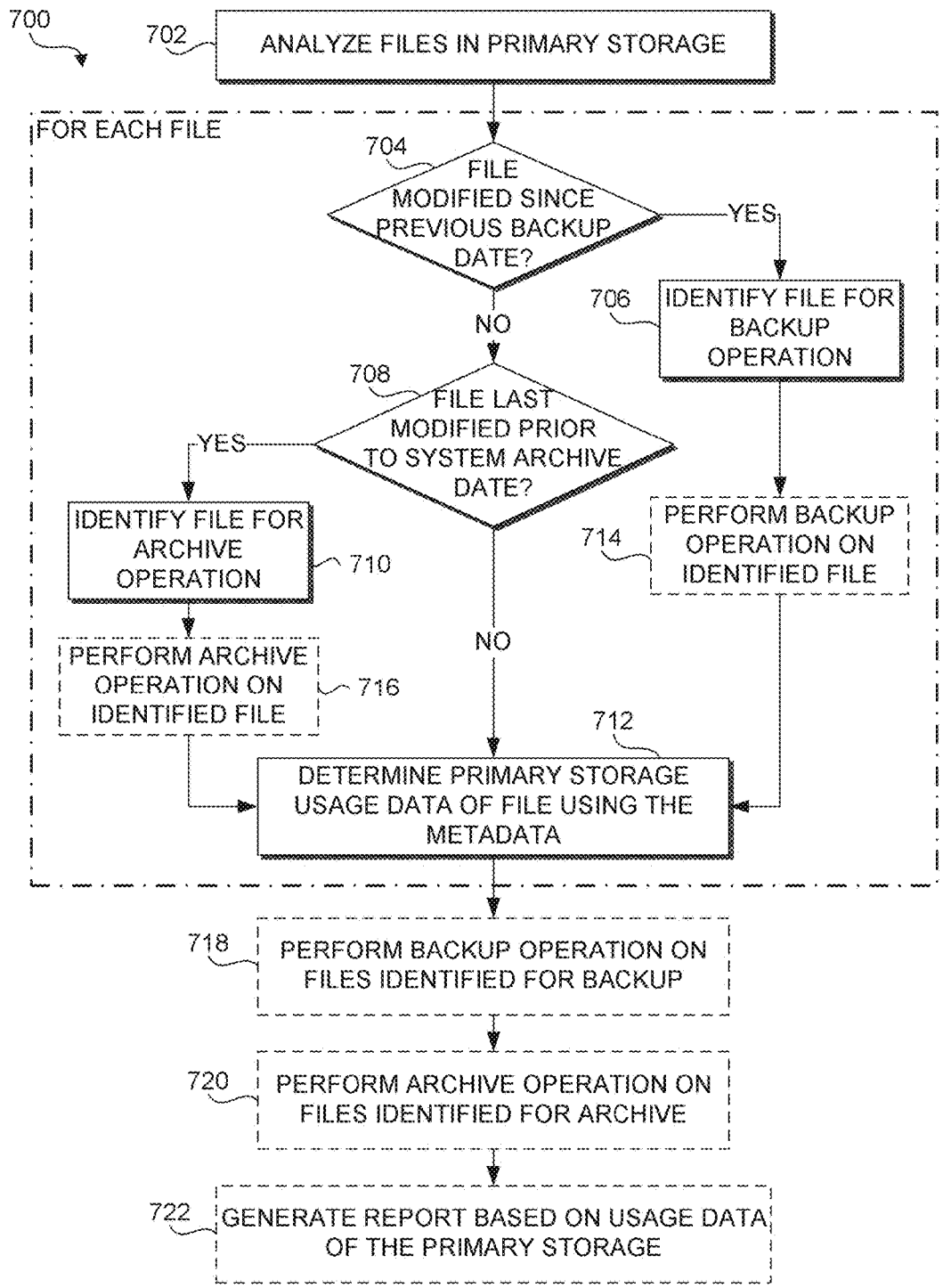

As an example, the data structures 180 illustrated in FIG. 7 may have been created as a result of two storage operations involving two clients 102. For example, a first storage operation on a first client 102 could result in the creation of the first chunk folder 184, and a second storage operation on a second client 102 could result in the creation of the second chunk folder 185. The container files 190/191 in the first chunk folder 184 would contain the blocks of SI data of the first client 102. If the two clients 102 have substantially similar data, the second storage operation on the data of the second client 102 would result in the media agent 144 storing primarily links to the data blocks of the first client 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 resides supports sparse files, then when the media agent 144 creates container files 190/191/193, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 Mb. In other examples, the media agent 144 creates a new container file 190/191/193 when a container file 190/191/193 satisfies other criteria (e.g., it contains from approximately 100 to approximately 1000 blocks or when its size exceeds approximately 50 Mb to 1 Gb).

In some cases, a file on which a storage operation is performed may comprise a large number of data blocks. For example, a 100 Mb file may be comprised in 400 data blocks of size 256 Kb. If such a file is to be stored, its data blocks may span more than one container file, or even more than one chunk folder. As another example, a database file of 20 Gb may comprise over 40,000 data blocks of size 512 Kb. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

Multiple Secondary Copy Operations Based on One Scan of Primary Storage

Figure 2:
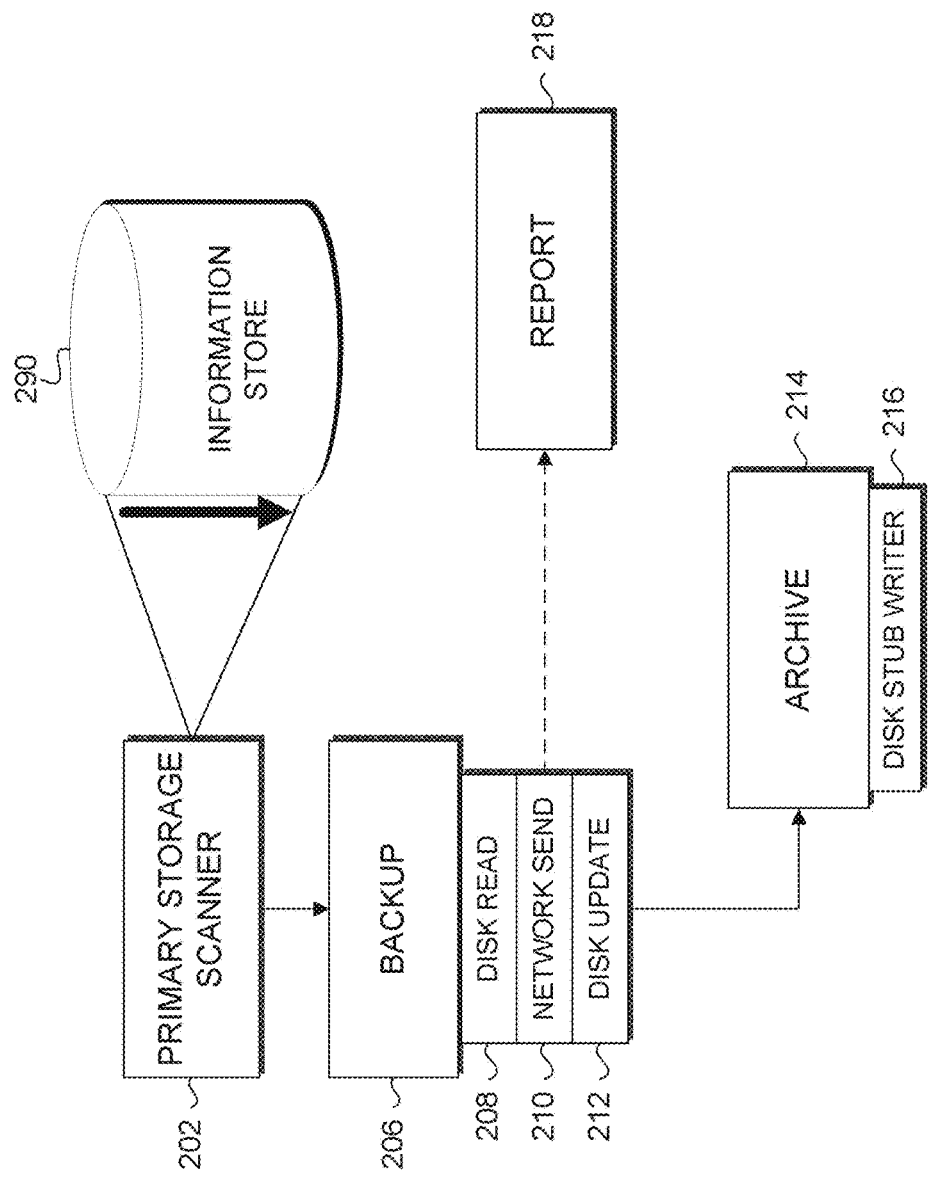
FIG. 2 is a block diagram illustrative of an embodiment of various components of an information management system.

FIG. 2 is a block diagram illustrative of embodiments of various components of the system 100, including a primary storage scanner 202, a backup component 206, an archive component 214, and a report component 218. The primary storage scanner 202, a backup component 206, an archive component 214, and a report component 218 can be implemented as part of one or more data agents 142 and/or media agents 144, as described in greater detail above with reference to FIG. 2.

The primary storage scanner 202 can scan an information store stored on or otherwise associated with one or more primary storage devices 104 once during a single scan session, and enable the system 100 to perform multiple, different secondary copy operations based on the single scan. In some embodiments, the scan occurs during a backup operation. The primary storage scanner 202 or a portion thereof can be implemented by one or more of the components described with respect to FIGS. 1A-1E. For instance, at least a portion of the primary storage scanner 202 may be implemented by one or more data agents 142. In some other embodiments, the primary storage scanner 202 or a portion thereof is implemented by a storage manager 140.

The primary storage scanner 202 can perform the scan in a variety of manners. For instance, the primary storage scanner 202 can traverse the primary storage devices 104. For example, during the scan session the primary storage scanner 202 in some embodiments scans through all of the relevant files (and/or associated metadata) in the information store 290 to identify files for backup, files to archive, reporting information, and the like. In some such cases, the primary storage scanner 202 generates an index based on the scan for later use (e.g., in archive or reporting operations). In some other cases, the primary storage scanner 202 performs the scanning by processing a pre-compiled data set corresponding to files on the primary storage device 104. For instance, a data agent(s) 142 or other appropriate component in the system 100 may identify files to be backed up, files to be archived, relevant reporting information about files, or other metadata associated with the files in the information store 290 on a generally on-going basis. For instance, the data agent(s) 142 can collect such information at the time files are accessed, changed (e.g., created, deleted, or modified), or the like. And, at the time of the scan, the primary storage scanner 202 may scan the pre-compiled data set including the collected information instead of traversing to each individual file in the information store 290. The pre-compiled data set may be stored in the primary storage device 104 or in some other location, such as in the storage manager database 146. And the pre-compiled data set can maintain entries relating to only a subset of the relevant files (e.g., files to be backed up), or to all of the relevant files, depending on the embodiment. As one specific example, a data agent 142 tracks changed files as the files are changed, in between backup and/or archive operations. At the time of the scan session, the primary storage scanner 202 scans the pre-compiled data set to identify files to include in the next backup operation. During the scan session, the primary storage scanner 202 may also scan the pre-compiled data set to identify files to include in the next archive operation.

In certain embodiments, the primary storage scanner 202 analyzes, tracks, and/or collects the metadata of the files stored on one or more disks associated with the primary storage devices 104 during a backup operation. In some embodiments, the collected metadata can be stored in an index. The collected metadata in the index can be analyzed during or after the backup to identify files for archive, or other secondary copy operations.

In some embodiments, the primary storage scanner 202 can analyze the metadata of the files stored on one or more disks associated with the primary storage devices 104 to determine which, if any, secondary copy operations are to be performed on the data. The primary storage scanner 202 can analyze all of the metadata of the files or only those portions of the metadata that relate to possible storage operations to be performed. For example, for backup and archive purposes, the primary storage scanner 202 can review the last modified date of the files, the creation date of the files, work order ID numbers or other metadata corresponding to changes made in the file, etc. For reporting purposes, the primary storage scanner 202 can analyze file size information, location of the blocks of data within a particular disk that make up the file, creation date, etc.

As the primary storage scanner 202 scans the information store 290 (e.g., traverses the files on the primary storage device(s) or traverses a pre-compiled index), it can track the relevant information for each file that is analyzed. For example, the primary storage scanner 202 can copy relevant metadata of the files that are being analyzed to an index. The system 100 can use the copied metadata to identify which secondary copy operation should be performed on which files. As mentioned previously, the secondary copy operations can include, but are not limited to, a backup operation, archive operation, HSM operation, snapshot operation, replication operation, disaster recovery operations, etc. For example, as the primary storage scanner 202 traverses the disks associated with the primary storage devices 104, it can scan 100 files in a primary storage device 104, and identify 50 files that should be backed up because they have been modified since a previous backup and 4 files that should be archived because they have not been modified since a system archival date (e.g., one year).

In some cases, once the disk(s) of the primary storage device 104 has been traversed (or during the traversal), the secondary copy operations can begin. In the illustrated embodiment of FIG. 2, the secondary copy operations include backup operations and archive operations performed by a backup component 206 and an archive component 214, respectively, however, it will be understood that other secondary copy operations can be performed. The system 100 can also perform one or more system operations in conjunction with the secondary copy operations. For example, as illustrated, the system can generate one or more reports using a report component 218.

In certain cases, the system 100 can perform the secondary copy operations on the files being analyzed as the primary storage scanner 202 scans the disk(s). For example, the backup component 206 can perform backup operations as the primary storage scanner 202 scans the disk(s) and copies the metadata. In some cases, one or more of the files are being scanned while storage operations (e.g., backup, archive, and/or reporting operations) are being performed on one or more other files. In some embodiments, if a file is identified for a backup operation, the system 100 can begin the backup operation for that file before the primary storage scanner 202 begins scanning another file. Furthermore, the metadata collected by primary storage scanner 202 during the backup can be stored for later use by the archive component 214 and report component 218.

It will be understood that the various operations performed by the different components can be performed sequentially or in parallel as desired. For example, as mentioned, the primary storage scanner 202 can scan the disk and track the metadata while the backup component 206 performs backup operations. Following the completion of the backup operation, the archive component can use the metadata collected during the backup operation to perform archive operations. Similarly, the report component 218 can use the metadata collected during the backup operation to generate reports. In embodiments where the archive component 214 and report component 218 use the metadata collected during the backup operation, the primary storage scanner 202 can track additional metadata, or in other words, track metadata that is not typically tracked during a backup operation.

The backup component 206 can be used to perform backup operations of the files identified for backup and include a disk read component 208, a network send component 210, and a disk update component 212. The backup component 206 and its constituent components or portions thereof may be implemented by one or more of the components described with respect to FIGS. 1A-1E. For instance, at least a portion of the backup component 206 can be implemented by one or more data agents 142, media agents 144, the storage manager 140, or any combination thereof.

The backup component 206 can perform a backup of changed files. The disk read component 208 can read and copy the portions of the disk that correspond to the data or files identified for backup. Once the data is read and copied, a network send component 210 can send the data to a media agent 144, as described in greater detail above with reference to FIGS. 1A-1E. In addition, the network send component 210 can transmit the collected usage information to the report component 218 for further processing. The disk update component 212 can update the disk (or other component such as one or more data agents 142 or the storage manager 140) to indicate that the files have been backed up. As part of the update, the disk update component 212 can add to or change the metadata of the files that were part of the backup operation. For example, the disk update component 212 can update the last modified date within the metadata or add the work order ID number (or other appropriate metadata) to a database of work order ID numbers (or other appropriate metadata) that have already been part of a backup operation.

The archive component 214 can be used to perform archive operations on the files identified for archive. In some embodiments, the archive component 214 uses the metadata that is tracked during the backup operation and/or disk traversal to identify files for archive. As part of the archive operations, the archive component can remove the files identified for archive from the primary storage devices 104. The archive component 214 can also create an archive copy of the files using either the data from the primary storage devices 104 or data obtained from a secondary copy of the file, such as a backup copy in secondary storage. The archive copy can be stored in secondary storage in a device configured for archive storage (e.g. magnetic tape, etc.). The archive component 214 can further include a disk stub writer 216, which can replace the files identified for archive with a stub, as described above. While described as a separate component, the archive component 214 may be implemented by the same entity as the backup component 206. For instance, one or more of the same data agents 142 and/or media agents 144 may implement both the backup component 206 and the archive component 214. In one embodiment, for instance, the relevant files are Microsoft Exchange files, and a data agent 142 dedicated or otherwise associated with Microsoft Exchange implements at least a portion of both the backup component 206 and the archive component 214.

The report component 218 can be used to generate reports of usage information of the primary storage based on the information, or metadata, collected by the primary storage scanner 202 and received from the network send component 210. The reports can include information regarding the amount of used storage space vs. available storage space in the primary storage device, the number of mount points of the primary storage device, the number of volumes in the primary storage device, types of disks used for storage in the primary storage device, usage trends, such as the rate at which data is being used, fault trending, etc., as desired by a user. While described as a separate component, the report component 218 may be implemented by the same entity as the backup component 206 and/or archive component 214. For instance, one or more data agents 142 and/or media agents 144 may implement at least two of the backup component 260, the archive component 214, and the report component 218. In one embodiment, for instance, the relevant files are Windows File System files, and a data agent 142 dedicated or otherwise associated with the Windows File System implements at least a portion of both the backup component 206, the archive component 214, and/or the report component 218.

As mentioned previously, other components can be implemented to perform other secondary copy operations on the data. For example, the system 100 can use HSM components, snapshot components, replication components, disaster recovery components, etc. to implement the various secondary copy operations on the data.

Figure 3:
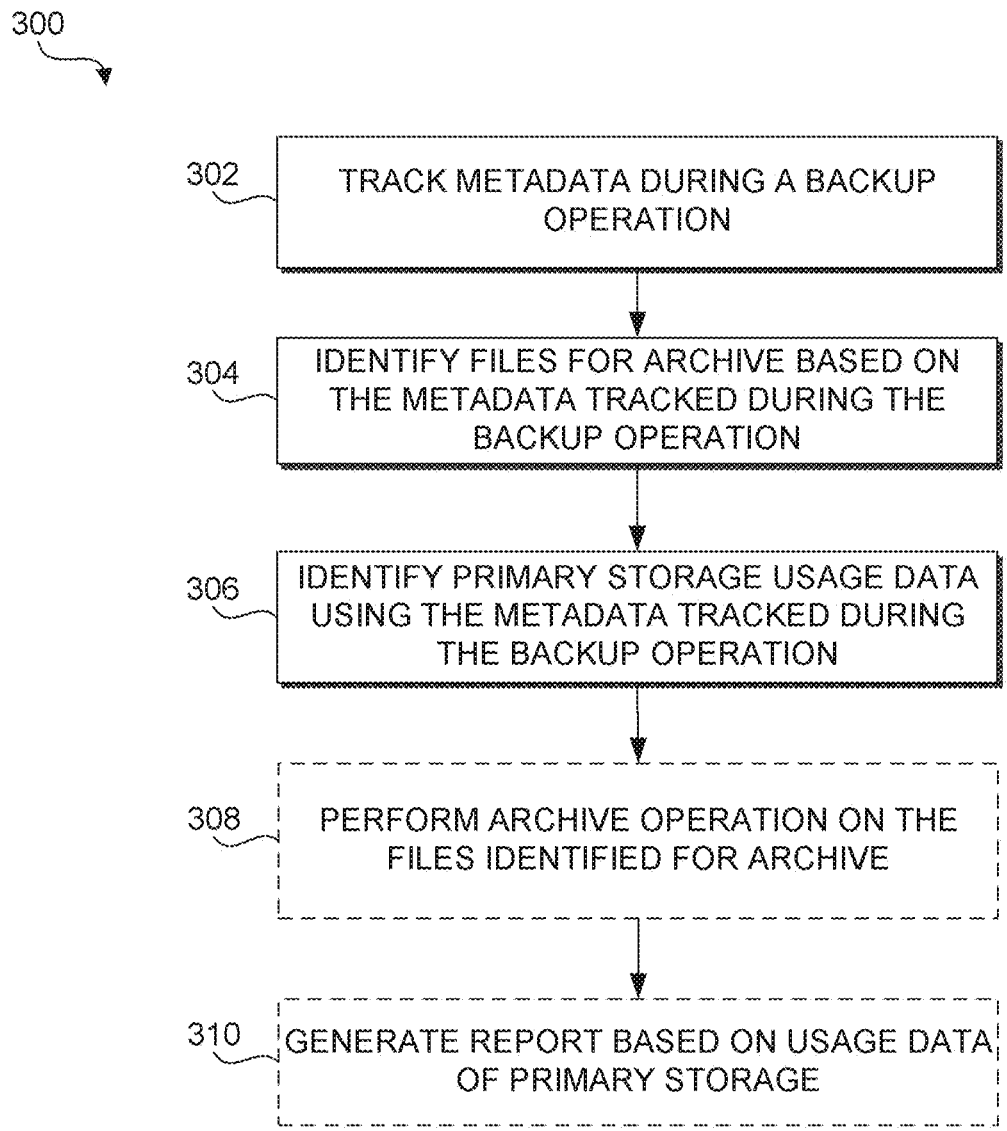
FIGS. 3-7 are flow diagram illustrative of embodiments of routines implemented by the information management system to identify files in primary storage for secondary copy operations.

FIG. 3 is a flow diagram illustrative of an embodiment of a routine 300 implemented by the system 100 to scan metadata of files in primary storage during a backup operation, and identify files for additional secondary copy operations using the metadata. One skilled in the relevant art will appreciate that the elements outlined for routine 300 can be implemented by one or more computing devices/components that are associated with the system 100, such as the client computing device 102, data agent(s) 142, media agent(s) 144, and/or storage manager 140. Accordingly, routine 300 has been logically associated as being generally performed by system 100. However, the following illustrative embodiment should not be construed as limiting.

At block 302, the system 100 tracks the metadata of files stored in one or more primary storage devices 104 during a backup operation. In some cases, as part of the tracking, the system 100 can copy the metadata into an index for later review. The copied metadata can be referred to as backup metadata. The index can be located in the primary storage device 104 or in a primary storage device that is distinct from the primary storage device 104. For example, the index can be stored in the database 146 of the storage manager 140. In yet other embodiments, the system 100 does not track the metadata as part of the backup operation itself, but instead maintains a pre-compiled data set, as described above (e.g., on an on-going basis, as files are modified).

The backup operation can include any number of different backup operations as described in greater detail above. For example, the backup operation can include a backup of files, or portions thereof, that have changed since a previous backup. The files, or portions of files, that are backed up can be identified using metadata associated with the files, which can include, but is not limited to, last edit/modify date, portions of file modified on last modify date, file creation date, file owner, file users, disk type where the file is located, volume type where the file is located, file size, etc. For example, if the modify date of a file indicates that it has been modified since a previous backup, the system 100 can identify the file for a backup operation. It will be understood that other metadata can be used to identify files for a backup operation. For example, if the metadata indicates that the file has not been backed up or been part of a snapshot for longer than a threshold period of time, the system 100 can identify the file for backup. The threshold period of time can vary based on the owner of the file, the users that that have used the file, the importance of the file, etc.

In some embodiments, a work order ID (or other appropriate metadata) can be assigned to the metadata of a file each time a modification or change is made. The system 100 can track the work order IDs, including the last work order ID that was part of a previous backup or snapshot operation. As the system 100 analyzes the work order IDs in primary storage, it can determine whether the work order ID of a file was part of a prior backup operation. If the work order ID was not part of the prior backup operation, the file can be identified for a backup operation.

In some embodiments, the system 100 performs only one scan of the primary storage as part of the routine 300 and in conjunction with the backup operation. In certain embodiments, the system 100 tracks all of the metadata of each file. In some embodiments, the system 100 tracks only some of the metadata. The metadata that is tracked by the system 100 can depend on the types of additional secondary copy operations that will be performed following the backup operation. For example, if the additional secondary copy operation is an archive operation, the system 100 can track the metadata corresponding to the last modify date of the file or a work order ID.

At block 304, the system 100 identifies files in the one or more primary storage devices 104 for archive, e.g., using the metadata tracked during the backup operation. In some embodiments, the identification occurs after the backup operation is complete. In certain embodiments, the identification occurs concurrently with the backup operation.

In some embodiments, the system 100 can identify the file for archive if the last modify date indicates that the file was last modified prior to a system archival date. The system archival date can be set by a storage policy to indicate at what point files should be archived. For example, the storage policy may indicate that files that have not been modified for more than one year or that were created more than three years ago should be archived.

In some embodiments, different metadata can be used to determine whether the file should be part of an archive, such as file creation date, file users, file importance, etc. For example, if the file is considered important or otherwise flagged (based on a ranking or rating of the file), the storage policy may indicate that the file should only be archived after a longer period of time. If the file is not considered important, it may be removed from primary storage after a threshold period of time without being copied to a secondary storage device. Similarly, the system 100 may vary the system archival date based on a user's identity. For example, the system 100 can have a one year system archival date for files used, owned, or created by User1 and a system archival date of three years for files used, owned, or created by User2. Although described in terms of archive operations, the system 100 can identify files for other secondary copy operations, such as, but not limited to, a snapshot, replication, emergency restore, HSM, etc.

At block 306, the system 100 determines usage data of the primary storage using the metadata tracked during the backup operation. For example, the system 100 can analyze the amount of storage used for each file, the location of each file on the volume or disk, any faults that occurred during the storage of the files, etc.

Additional, fewer, or different blocks can be used to implement the routine 300 without departing from the spirit and scope of the description. For example, any one or a combination of blocks 308 and 310 can be used as part of routine 300.

At block 308, the system 100 performs the archive operation on the files identified for archive. As part of the archive operation, the system 100 can copy the file from the primary storage to secondary storage or copy a copy of the file from secondary storage to archive storage. The archive storage can be a separate storage device for long term storage, as described in greater detail above. The archive storage device may be one of the secondary storage devices 108, such as one or more secondary storage devices 108 that are different than the secondary storage devices 108 used to store backup copies, or the archive storage can include other storage devices that are different from the primary 104 and secondary storage devices 108. In some cases, the system can also verify that a backup or other copy of the file is located in secondary storage as part of the archive operation. Once the system 100 has determined that a copy of the file in primary storage is in secondary storage, the system 100 can remove the file from primary storage and, depending on the type of archive operation, replace it with a stub file, as described in greater detail above.

As discussed, in some cases the system can generate a report based on information gathered during the scanning session. For instance, at block 310, the system 100 can generate a report of the usage data of primary storage using the metadata obtained during the backup operation, as described above with reference to block 302, the system 100 can generate a report of the usage data of primary storage. For example, the system 100 can generate reports regarding the amount of storage used compared to the amount of storage available, the rate at which data is being used, trends in the number of faults occurring during secondary copy operations, etc.

Figure 4:
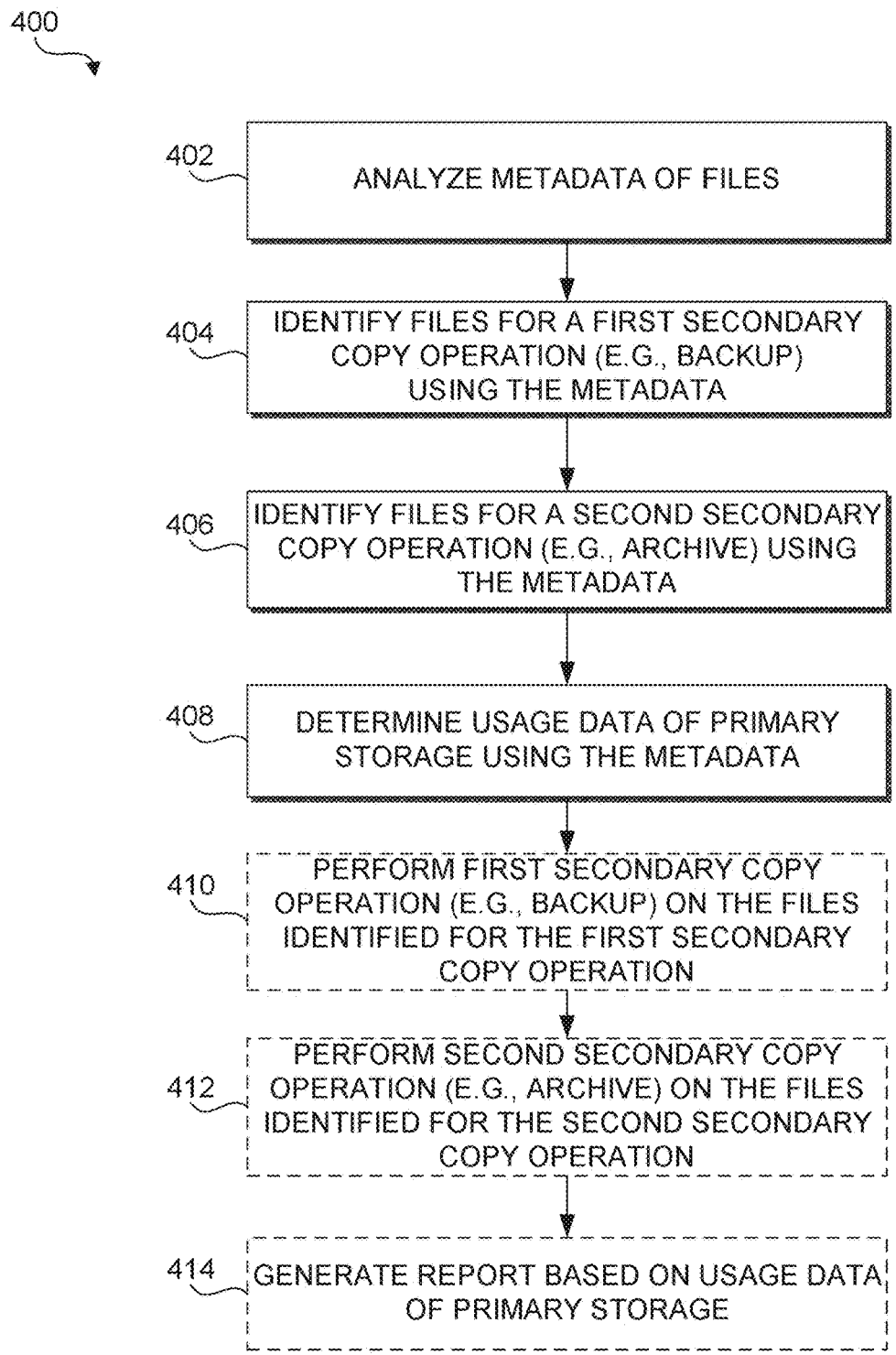

FIG. 4 is a flow diagram illustrative of an embodiment of a routine 400 implemented by the system 100 to identify files in primary storage for secondary copy operations. One skilled in the relevant art will appreciate that the elements outlined for routine 400 can be implemented by one or more computing devices/components that are associated with the system 100, such as the storage manager 140, client computing device 102, media agents 144, and/or data agents 142. Accordingly, routine 400 has been logically associated as being generally performed by system 100. However, the following illustrative embodiment should not be construed as limiting.

At block 402, the system 100 analyzes the metadata of files stored in one or more primary storage devices 104 during a scan of the primary storage. In some embodiments, as part of the analysis, the system 100 can copy the metadata into a buffer for later review and identification, as described in greater detail below with reference to blocks 404 and 406. In certain embodiments, the system 100 reviews the metadata and identifies the files as part of the analysis (also described in greater detail below with reference to blocks 404 and 406).

In some embodiments, the system 100 performs only one scan of the primary storage as part of the routine 400. In certain embodiments, the system 100 analyzes all of the metadata of each file. In some embodiments, the system 100 analyzes only some of the metadata. The metadata analyzed by the system 100 can depend on the type of secondary copy operation or storage operation being performed. For example, if the secondary copy operation is a backup operation, the system 100 can analyze the metadata corresponding to the last modify date of the file or a work order ID. The metadata can include, but is not limited to, last edit/modify date, portions of file modified on last modify date, file creation date, file owner, file users, disk type where the file is located, volume type where the file is located, file size, etc.

At blocks 404 and 406, the system 100 identifies files in the one or more information stores 290 of the primary storage for a first secondary copy operation (e.g., a backup or replication operation) and a second secondary copy operation (e.g., an archive, HSM, or ILM operation) using the metadata. As mentioned previously, the secondary copy operations can include, but are not limited to, a backup, snapshot, archive, replication, emergency restore, HSM, etc. In some embodiments, the identification at blocks 404 and 406 can be performed as part of the analysis mentioned in block 402. Thus, in some embodiments, during the scan and for each file, the system 100 analyzes the metadata, and determines whether the file should be identified for a first or second secondary copy operation prior to analyzing the metadata of another file (or in parallel with analyzing metadata one or more other files, depending on the embodiment).

In some cases, the system 100 creates a copy of the relevant metadata of the files during the analysis. Once the scan is complete, the system 100 reviews the metadata gathered during the scan to determine which files should be identified for the first copy operation or second secondary copy operations. For instance, the system 100 may review gathered metadata and for each file determine both (1) whether that file should be backed up and (2) whether that file should be archived. Thus, in some embodiments, once the scan of the primary storage is completed, the system 100 reviews the metadata and identifies files gathered during the scan to determine which files to include in the first and second copy operations concurrently, or substantially concurrently. For instance, files are both analyzed for inclusion in a first secondary copy operation and for inclusion in a second secondary copy operation within a single traversal of the set of gathered metadata, closely in time, or otherwise using the metadata gathered during the relevant scan session, and not necessarily simultaneously. In some embodiments, a file identified for a secondary copy operation is identified for inclusion in only one secondary copy operation. In certain embodiments, a file identified for one secondary copy operation can also be identified for inclusion in other secondary copy operations.

As part of the identification, the system 100 can review the relevant metadata of the files based on the type of secondary copy operation being performed. For example, if the secondary copy operation is a backup or snapshot operation, the system 100 can review the metadata corresponding to the last modify date of the file. If the last modify date indicates that the file has been modified since a previous backup or snapshot date, the system 100 can identify the file for backup or a snapshot, respectively.

It will be understood that other data can be used to identify files for a backup or snapshot operation. For example, if the metadata indicates that the file has not been backed up or been part of a snapshot for longer than a threshold period of time, the system 100 can identify the file for backup or snapshot. The threshold period of time can vary based on the owner of the file, the users that that have used the file, the importance of the file, etc.

In some embodiments, a work order ID can be assigned to the metadata of a file each time a modification or change is made. The system 100 can track the work order IDs, including the last work order ID that was part of a previous backup or snapshot operation. As the system 100 analyzes the work order IDs in primary storage, it can determine whether the work order ID of a file was part of a prior backup operation. If the work order ID was not part of the prior backup operation, the file can be identified for a backup operation.

The system 100 can likewise use relevant metadata to determine whether the file should be identified for an archive or HSM operation. For example, the system 100 can identify the file for archive or an HSM operation if the last modify date indicates that the file was last modified prior to a system archival date. The system archival date can be set by a storage policy to indicate at what point files that have not been modified should be archived. For example, the storage policy may indicate that files that have not been modified for more than year should be archived. In some embodiments, other metadata can be used to determine whether the file should be part of an archive or HSM operation, such as file creation date, file users, file importance, etc. For example, the storage policy can indicate files that were created more than three years ago should be archived. The archive date can change based on the identity of the users or file importance. For example, if the file is considered important (e.g., based on a ranking or rating of the file in metadata), the storage policy may indicate that the file should only be archived after a longer period of time. If the file is not considered important, it may be removed from primary storage after a threshold period of time without being copied to a secondary storage device.

The system 100 can also use the relevant metadata to determine whether the file should be identified for an emergency restore operation. For example, if the metadata indicates that the file is important, the system 100 can identify the file for an emergency restore operation. Similarly, the file can be identified for an emergency restore operation if it has been modified since a prior emergency restore operation.

At block 408, the system 100 determines usage data of the primary storage using the metadata. During the analysis described above with reference to block 402 of the metadata gathered during the scan, the system 100 can also identify usage data of each file during the scan using the metadata. For example, the system 100 can analyze the amount of storage used for the file, the location of the file on the volume or disk, any faults that occurred during the storage of the file, etc. The system 100 can analyze this information concurrently or substantially concurrently with the other data that is analyzed for the secondary copy operations. For instance, within a single traversal of the set of gathered metadata, or otherwise using the metadata gathered during the relevant scan session (although not necessarily simultaneously), files are analyzed for inclusion in first and/or secondary copy operations and information is identified for possible reporting purposes. Once the scan is completed, the system 100 can use the relevant metadata analyzed from each file to determine the usage of primary storage as a whole.

Additional, fewer, or different blocks can be used to implement the routine 400 without departing from the spirit and scope of the description. For example, any one or a combination of blocks 410, 412, and 414 can be used as part of routine 400.

At block 410, the system 100 can perform the first secondary copy operation on the files identified for the first secondary copy operation. The system 100 can perform the first secondary copy operation during the scan of primary storage or once the scan is completed. In some embodiments, the system 100 performs the first secondary copy operations during the analysis of the file and prior to analyzing another file (or in parallel with analyzing metadata of one or more other files, depending on the embodiment). In certain embodiments, the system 100 performs the first secondary copy operation after the scan has been completed. In such embodiments, the system 100 can perform the first secondary copy operation on multiple files at the same time. For example, the system 100 can perform the first secondary copy operation on all the files identified for the first secondary copy operation during the scan.

At block 412, the system 100 can perform the second secondary copy operation on the files identified for the second secondary copy operation. As described in greater detail above with reference to block 410, the system can perform the second secondary copy operation during the scan of primary storage or once the scan is completed. In some embodiments, the first and second secondary copy operations can be performed concurrently on the same file or files. For example, if a file is identified for both archive and HSM, the system 100 can perform both the archive and HSM operations on the file before proceeding to another file. Similarly, if one group of files is identified for a snapshot operation and another group of files is identified for archive operations, the system 100 can perform both the snapshot and archive operations at approximately the same time.

In certain embodiments, such as when the system 100 is performing a first secondary copy operation on a first group files and performing a second secondary copy operation on a second group of files, the system 100 can complete the first secondary copy operation on the first group of files before performing the second secondary copy operation on the second group of files. In some cases, the system 100 can revise the files that are in the second group based on the files in the first group. For example, if the system 100 is to perform an archive operation on a first group of files and a backup operation on a second group of files (each group possibly containing some of the same files), the system can complete the archive of the relevant files before the backup, or vice versa. In some embodiments, upon completing the archive operation, the system 100 can remove files from the second group (group identified for backup) that were archived as part of the first group. In this way, the system 100 can reduce the operations performed on the files as a whole by removing the files that are archived from the group of files that are to be backed up.

At block 414, the system 100 can generate a report of the usage data of primary storage based on the metadata of the files. Using the usage data obtained during the scan, as described above with reference to block 408, the system 100 can generate a report of the usage data of primary storage. For example, the system 100 can generate reports regarding the amount of storage used compared to the amount of storage available, the rate at which data is being used, trends in the number of faults occurring during secondary copy operations, etc.

Figure 5:
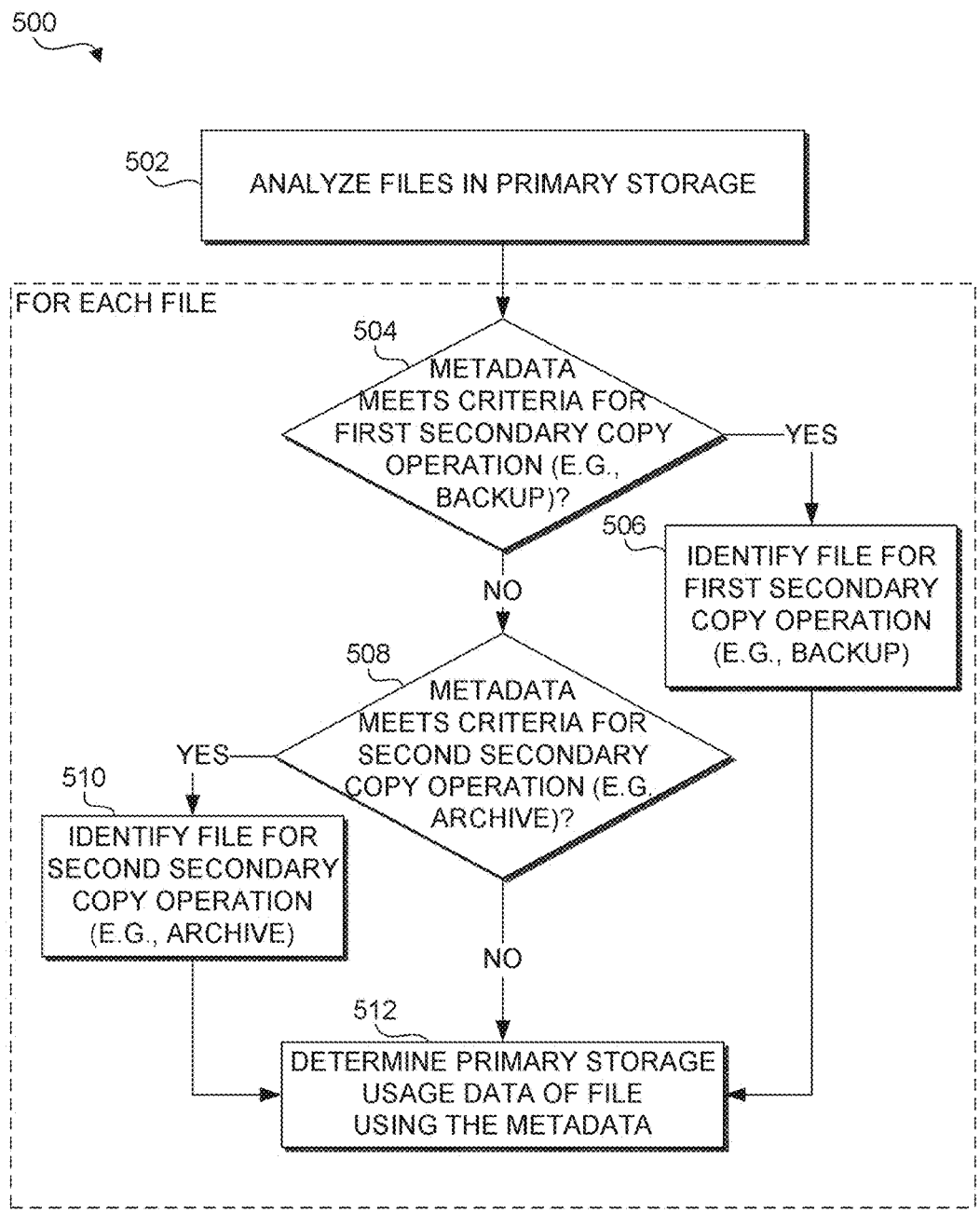

FIG. 5 is a flow diagram illustrative of an embodiment of a routine 500 implemented by the system 100 to identify files in primary storage for secondary copy operations. One skilled in the relevant art will appreciate that the elements outlined for routine 500 can be implemented by one or more computing devices/components that are associated with the system 100, such as the storage manager 140, client computing device 102, media agents 144, and/or data agents 142. Accordingly, routine 500 has been logically associated as being generally performed by system 100. However, the following illustrative embodiment should not be construed as limiting.

At block 502, the system 100 analyzes the files stored in one or more information stores 290 of primary storage (or primary storage devices 104) during a scan of the primary storage, as described in greater detail above with reference to block 402 of FIG. 4. As indicated previously, in some other embodiments, the system 100 can scan a pre-complied data set, which may or may not be stored on the primary storage device(s) 104.

In the illustrated embodiment, the system 100 analyzes the metadata for each file. For instance, the metadata can be analyzed for each file individually and prior to analyzing the metadata of another file to determine whether the metadata of the filing being analyzed meets the criteria of any one of multiple secondary copy operations. In such a case, blocks 504, 506, 508, 510, and 512 are performed on each file prior to review of another file. Or, in other cases, the metadata can be analyzed in parallel for one or more files (e.g., via different software threads).

At block 504, the system determines whether the metadata of the file meets the criteria for a first secondary copy operation. As described in greater detail above with reference to block 404, the system 100 can use different metadata to determine whether the file meets the criteria of different secondary copy operations. For example, and as described above, for backup and snapshot operations, the system 100 can determine whether the file has been modified since a previous backup or snapshot operations. For archive and HSM operations, the system 100 can determine whether the file was last modified prior to a system archival date, etc.

If the system 100 determines that the metadata of the file meets the criteria for the first secondary copy operation, the system 100 identifies the file for the first secondary copy operation, as illustrated at block 506. By identifying the file for the first secondary copy operation, the system 100 can perform the first secondary copy operation on the file. The system 100 can perform the first secondary copy operation on the file at the time it is identified or at a different time, such as after some or all of the files in the primary storage have been analyzed. Once the file has been identified, the system moves to block 512, as will be described in greater detail below.

On the other hand, if the system 100 determines that the metadata of the file does not meet the criteria for the first secondary copy operation, the system 100 can determine whether the metadata of the file meets the criteria for a second secondary copy operation, as illustrated at block 508. As described in greater detail above with reference to block 406, the metadata and criteria used for the second secondary copy operation can be different from the metadata and criteria used for the first secondary copy operation.

If the system 100 determines that the metadata of the file meets the criteria for the second secondary copy operation, the system 100 identifies the file for the second secondary copy operation, as illustrated at block 510. By identifying the file for the second secondary copy operation, the system 100 can perform the second secondary copy operation on the file. The system 100 can perform the second secondary copy operation on the file at the time it is identified or at a different time, such as after some or all of the files in the primary storage have been analyzed.

Once the file has been identified for the first or second secondary copy operation or the metadata does not meet the criteria for the second secondary copy operation, the system can concurrently determine primary storage usage data of the file using the metadata, as illustrated at block 512. For example, the system can determine primary storage usage data as part of the same process of reviewing the metadata gathered at block 502 that occurred at blocks 504 and 508. While the review performed at blocks 504, 508, and 512 may occur during same pass through the metadata gathered at block 502, or otherwise using the same set of metadata gathered during the relevant scan session, the operations described in blocks 504, 508 and 512 are not necessarily executed simultaneously. As described in greater detail above with reference to block 408 of FIG. 4, the system 100 uses metadata of the file being analyzed, which can be different from the metadata used for the secondary copy operations, to determine usage data of the primary storage as a whole. The metadata corresponding to usage data can be collected concurrently with the identification of the file for the first or second secondary copy operation.

Additional, fewer, or different blocks can be used to implement the routine 500 without departing from the spirit and scope of the description. For example, although illustrated as performing the determination blocks sequentially, the system 100 can determine whether the metadata meets the criteria for the first and/or second secondary copy operations concurrently, or in parallel. Furthermore, in some embodiments, if a file meets the criteria for the first secondary copy operation, the system can also determine whether the file meets the criteria for the second secondary copy operation. For example, if the metadata of a file meets the criteria for a backup, the system 100 can also determine whether the metadata meets the criteria for an archive operation.

In addition, as described in greater detail above with reference to blocks 410 and 412 of FIG. 4, the system 100 can perform the first and/or second secondary copy operations on the identified files. In some embodiments, the system 100 can perform the first and/or second copy operations on the identified files prior to analyzing another file. Or, depending on the implementation, the system 100 can perform the operations in parallel with corresponding operations for one or more other files. For example, the system 100 can perform the first secondary copy operation on the file once it is determined that the file meets the criteria for the first secondary copy operation (e.g., in place of block 506 or between block 506 and block 512). Similarly, the system 100 can perform the second secondary copy operation on the file once it is determined that the file meets the criteria for the second secondary copy operation (e.g., in place of block 510 or between block 510 and block 512). In certain embodiments, the system 100 can perform the first and/or second copy operations on the identified files after analyzing some or all of the files (e.g., after block 512).

Furthermore, as described in greater detail above with reference to block 414 of FIG. 4, the system 100 can generate a report of the usage data of primary storage based on the metadata of the files. The report can be based on the metadata of the individual files that are analyzed by the system 100.

Figure 6:
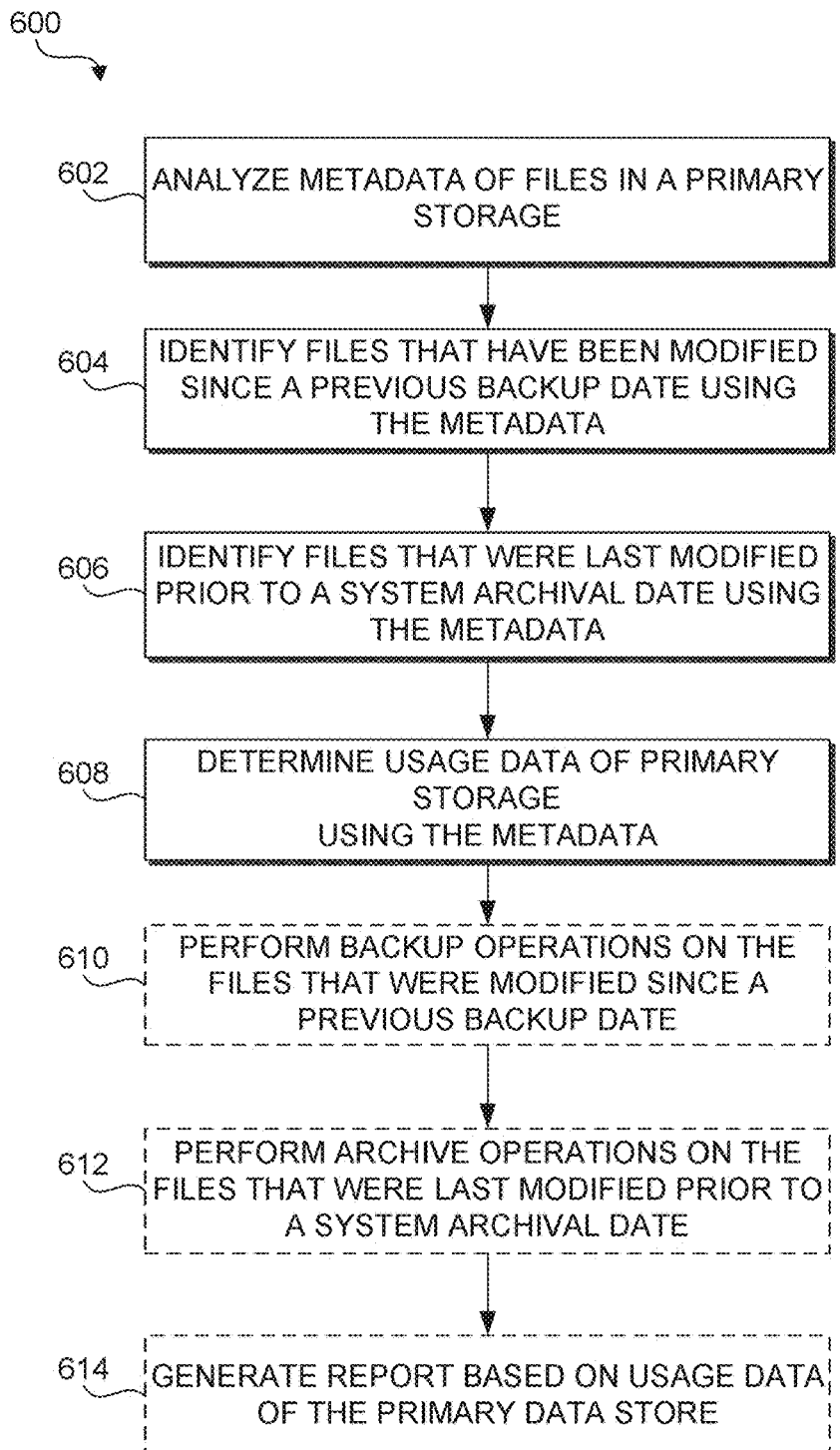

FIG. 6 is a flow diagram illustrative of an embodiment of a routine 600 implemented by the system 100 to identify files in primary storage for backup and/or archive operations. One skilled in the relevant art will appreciate that the elements outlined for routine 600 can be implemented by one or more computing devices/components that are associated with the system 100, such as the storage manager 140, client computing device 102, media agents 144, and/or data agents 142. Accordingly, routine 600 has been logically associated as being generally performed by system 100. However, the following illustrative embodiment should not be construed as limiting.

At block 602, the system 100 analyzes the files stored in one or more information stores 290 of primary storage during a scan of the primary storage, as described in greater detail above with reference to block 402 of FIG. 4. As discussed in greater details above, the system 100 can analyze the metadata of the files during a single scan of the primary storage. In some embodiments, the system 100 copies the metadata for later analysis. For example, based on the storage policy, the system 100 can copy the relevant metadata during a scan of the primary storage. After the scan is complete, the system can identify files for backup and archive based on the copied metadata.

In certain embodiments, the system 100 analyzes the metadata for each file individually and prior to analyzing the metadata of another file (or in parallel with analyzing metadata of one or more other files, depending on the embodiment). For example, as the system 100 analyzes relevant metadata of a file, it can determine whether the file should form part of a backup and/or archive operation prior to analyzing the metadata of another file.

At block 604, the system 100 uses the metadata of the files to identify files that have been modified since a previous backup date. The system 100 can use a variety of metadata to determine whether the file has been modified since a previous backup operation. In some embodiments, the system can use a last modified date of the file. For example, the system 100 can compare a last modified date of the file, which is part of the analyzed metadata, with the date at which the last backup of the primary storage occurred. If the last modified date occurred more recently in time than the date of the last backup, the file can be identified for a backup operation. If the date of the last backup occurred more recently, the system 100 may not identify the file for backup. As mentioned, in certain embodiments, the system 100 can use a work order ID, creation date, etc. to determine whether the file has been modified since a previous backup date.

In some embodiments, the system 100 simply determines whether the file is to be part of a backup operation. As mentioned previously, the system can use a variety of metadata to determine whether the file should be part of a backup operation. For example, the system 100 can use a work order ID, file owner information, file user's information, creation date, importance level, etc. to determine whether the file should be part of a backup operation.

At block 606, the system 100 reviews the metadata gathered during the scan to identify files that were last modified prior to a system archival date. The system archival date can refer to a date or period of time when files are archived. For example, the system archival date may be one year for unmodified files, or five years from the creation date of the file. The system 100 can use a variety of metadata to determine whether the file was last modified prior to a system archival date. In some embodiments, the system 100 uses a last modified date. For example, the system 100 can compare the last modified date of the file with the system archival date. The system archival date can be based on a storage policy, as described previously. If the system archival date occurred more recently in time than the last modified date, the system 100 can identify the file for an archive operation. If the last modified date occurred more recently in time than the system archival date, the system may not identify the file for an archive operation. In some cases, the review that occurs at block 606 may occur concurrently with the review that occurs in block 604, e.g., in the sense that they occur within a single traversal of the set of metadata gathered at block 602, closely in time, or otherwise using the metadata gathered during the relevant scan session, and not necessarily simultaneously.

At block 608, the system 100 uses the metadata to determine usage data of the primary storage, as described in greater detail above, with reference to block 408 of FIG. 4. In some cases, the review that occurs at block 608 may occur concurrently with the review that occurs in blocks 604 or 506 in the sense that they occur within a single traversal of the set of gathered metadata, closely in time, or otherwise using the metadata gathered during the relevant scan session (although not necessarily simultaneously).

The system 100 can perform the various components of the blocks sequentially or concurrently as desired. Furthermore, additional, fewer, or different blocks can be used to implement the routine 600 without departing from the spirit and scope of the description. For example, any one or a combination of blocks 610, 612, and 614 can be used as part of routine 600.

At block 610, the system 100 can perform the backup operation on the files identified for the backup operation. The system 100 can perform the backup operation during the scan of primary storage or once the scan is completed. In some embodiments, the system 100 performs the backup operation during the analysis of the file and prior to analyzing another file. In certain embodiments, the system 100 performs the backup operation after the scan has been completed. In such embodiments, the system 100 can perform the backup operation on multiple files concurrently. For example, the system 100 can concurrently perform the backup operation on all the files identified for the backup operation. As part of the backup operation, the system 100 can copy the file, or portions thereof, from primary storage to secondary storage. In addition, once the file, or portions thereof, have been copied to secondary storage, the system 100 can update the metadata of the file to indicate the new backup date.

At block 612, the system 100 can perform the archive operation on the files identified for the archive operation. As described in greater detail above with reference to block 610, the system can perform the archive operation during the scan of primary storage or once the scan is completed. As part of the archive operation, the system 100 can copy the file from the primary storage to secondary storage, or from secondary storage to archive storage. The archive storage can be a separate storage device for long term storage, as described in greater detail above. Once the file is copied from primary storage or secondary storage, the system 100 can remove the file from primary storage and replace it with a stub file, as described in greater detail above.

In some embodiments, the backup and archive operations can be performed concurrently on the same file or files. For example, if a file is identified for both backup and archive operations, the system 100 can perform both the backup and archive operations on the file before proceeding to another file. Similarly, if one group of files is identified for a backup operation and another group of files is identified for archive operations, the system 100 can perform both the backup and archive operations at approximately the same time.

In certain embodiments, if the system 100 is to perform an archive operation on a first group of files and a backup operation on a second group of files (each group possibly containing some of the same files), the system can complete the archive of the relevant files before the backup, or vice versa. In this way, the system 100 can reduce the operations performed on the files as a whole by removing the files that are archived from the group of files that are to be backed up.

At block 614, the system 100 can generate a report of the usage data of primary storage based on the metadata of the files. Using the usage data obtained during the scan, as described above with reference to block 608, the system 100 can generate a report of the usage data of primary storage. For example, the system 100 can generate reports regarding the amount of storage used compared to the amount of storage available, the rate at which data is being used, trends in the number of faults occurring during secondary copy operations, etc.

FIG. 7 is a flow diagram illustrative of an embodiment of a routine 700 implemented by the system 100 to identify files in primary storage for backup and archive storage operations. One skilled in the relevant art will appreciate that the elements outlined for routine 700 can be implemented by one or more computing devices/components that are associated with the system 100, such as the storage manager 140, client computing device 102, media agents 144, and/or data agents 142. Accordingly, routine 700 has been logically associated as being generally performed by system 100. However, the following illustrative embodiment should not be construed as limiting.

At block 702, the system 100 analyzes the files stored in one or more information stores of primary storage during a scan of the primary storage, as described in greater detail above with reference to block 602 of FIG. 6. As indicated previously, in some other embodiments, the system 100 can scan a pre-complied data set, which may or may not be stored on the primary storage device(s) 104.

In the illustrated embodiment, the system 100 analyzes the metadata for each file. For instance, the metadata can be analyzed for each file individually and prior to analyzing the metadata of another file to determine whether the metadata of the filing being analyzed meets the criteria of any one of multiple secondary copy operations. In such a case, blocks 704, 706, 708, 710, and 712 are performed on each file prior to review of another file. Or, in other cases, the metadata can be analyzed in parallel for one or more files (e.g., via different software threads).

At block 704, the system determines whether the metadata of the file meets the criteria for a backup operation. As described in greater detail above with reference to block 604, the system 100 can use different portions of the file metadata to determine whether the file meets the criteria of different secondary copy operations. For example, and as described above, for backup and snapshot operations, the system 100 can determine whether the file has been modified since a previous backup or snapshot operations; for archive and HSM operations, the system 100 can determine whether the file was last modified prior to a system archival date, etc.

If the system 100 determines that the metadata of the file meets the criteria for the backup operation, the system 100 identifies the file for the backup operation, as illustrated at block 706. By identifying the file for the backup operation, the system 100 can perform the backup operation on the file either at the time the file is identified or at a different time, such as after some or all of the files in the primary storage have been analyzed. Once the file has been identified, the system moves to block 712, as will be described in greater detail below.

On the other hand, if the system 100 determines that the metadata of the file does not meet the criteria for the backup operation, the system 100 can determine whether the metadata of the file meets the criteria for an archive operation, as illustrated at block 708. As described in greater detail above with reference to block 606, the metadata and criteria used for the archive operation can be different from the metadata and criteria used for the backup operation.

If the system 100 determines that the metadata of the file meets the criteria for the archive operation, the system 100 identifies the file for the archive operation, as illustrated at block 710. By identifying the file for the archive operation, the system 100 can perform the archive operation on the file either at the time the file is identified or at a different time, such as after some or all of the files in the primary storage have been analyzed.

Once the file has been identified for the backup or archive operation, or the metadata does not meet the criteria for the archive operation, the system uses the metadata to determine usage data of the primary storage, as illustrated at block 712. In some embodiments, the system can determine primary storage usage data as part of the same process of reviewing of metadata gathered at block 702 that occurred at blocks 704 and 708. While the review performed at blocks 704, 708, and 712 may occur during same pass through the metadata gathered at block 702, or otherwise using the same set of metadata gathered during the relevant scan session, blocks 704, 708 and 712 do not necessarily occur simultaneously. As described in greater detail above with reference to block 608 of FIG. 6, the system 100 uses metadata of the file being analyzed, which can be different from the metadata used for the secondary copy operations, to determine primary storage usage data of the primary storage as a whole. The metadata corresponding to usage data can be collected concurrently with the identification of the file for the backup or archive operation.

Additional, fewer, or different blocks can be used to implement the routine 700 without departing from the spirit and scope of the description. For example, although illustrated as performing the determination blocks sequentially, the system 100 can determine whether the metadata meets the criteria for the first and/or second secondary copy operations in parallel. Furthermore, in some embodiments, if a file meets the criteria for the backup operation, the system will also determine whether the file meets the criteria for the archive operation. For example, if the metadata of a file meets the criteria for a backup, the system 100 can also determine whether the metadata meets the criteria for an archive operation.

Furthermore, as described in greater detail above with reference to blocks 610 and 612 of FIG. 6, the system 100 can perform the backup and/or archive operations on the identified files. The backup and archive operations can be performed during the analysis of a file and prior to analyzing another file (e.g., blocks 714 and 716) or can be performed once the scan of the primary storage is complete (e.g., block 718 and 720).

Blocks 714 and 716 illustrate an embodiment of the routine 700 where the system 100 can perform the backup and archive operations of a file prior to reviewing the metadata of another file (or in parallel with analyzing metadata of one or more other files, depending on the embodiment). As illustrated in FIG. 7, once a file has been identified for a backup operation (block 706), the system 100 can perform the backup operation on the identified file prior to reviewing the metadata of another file, as illustrated at block 714. As part of the backup operation, the system 100 can copy the entire file, or portions thereof to secondary storage using a media agent 144.

As further illustrated in FIG. 7, once a file has been identified for an archive operation (block 708), the system 100 can perform the archive operations on the identified file prior to reviewing the metadata of another file (or in parallel with analyzing metadata of another file, depending on the embodiment), as illustrated at block 716. As part of the archive operation, the system 100 can copy the file from primary or secondary storage to archive storage and replace the file in primary storage with a file stub, as described in greater detail above with reference to block 612 of FIG. 6.

Blocks 718 and 720 illustrate embodiments of the routine 700 where the system 100 performs the backup and archive operations of one or more files following the analysis of the files in primary storage. For example, once the scan of primary storage is complete, the system 100 can perform the backup operation on the one or more files identified for backup, as illustrated at block 718 and described in greater detail above with reference to block 612 of FIG. 6. Similarly, the system 100 can perform the archive operation on the one or more files identified for archive during the scan of the primary storage, as illustrated at block 718 and described in greater detail above with reference to block 614 of FIG. 6.

In addition, the system 100 can generate one or more reports based on the usage data of the primary storage, as illustrated at block 722 and as described in greater detail above with reference to block 616 of FIG. 6.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed:

1. A method, comprising:
copying, during a backup of one or more non-volatile information stores of primary storage, metadata of a plurality of files stored in the one or more non-volatile information stores to an index, the metadata copied to the index including at least modification date data of each file of the plurality of files, wherein the backup comprises:
identifying a first set of one or more files of the plurality of files for a backup operation based at least in part on a determination that the first set of one or more files were modified since a previous backup date, and
performing the backup operation on the first set of one or more files of the plurality of files, wherein the previous backup date indicates a date when modifications to files in the one or more non-volatile information stores were most recently copied to secondary storage;
following the backup operation of the one or more non-volatile information stores, reviewing the metadata copied to the index during the backup to identify a second set of one or more files of the plurality of files that were last modified prior to a system archival date; and
performing an archive operation on the second set of one or more files of the plurality of files, wherein the archive operation includes replacing a particular file of the second set of one or more files with an identifier indicating a location of one or more copies of the particular file in the secondary storage.

2. The method of claim 1, wherein the system archival date is based at least in part on at least one of a creation date, last access date, and last modify date of each file.

3. The method of claim 1, wherein the system archival date is based at least in part on an identity of at least one of a user of each file and a creator of each file.

4. The method of claim 1, wherein the system archival date is based at least in part on a rating of each file.

5. The method of claim 1, further comprising verifying the one or more copies of the second set of one or more files are located in the secondary storage prior to performing the archive operation.

6. The method of claim 1, further comprising identifying primary storage usage data of each file of the plurality of files using the metadata copied to the index.

7. The method of claim 6, wherein the primary storage usage data of each file comprises at least file size data, disk type data, and volume type data.

8. The method of claim 6, further comprising generating a report of the primary storage usage data.

9. The method of claim 8, wherein the report comprises usage trending of the primary storage, fault trending in the primary storage, number of mount points, number of volumes, types of disks in the primary storage, and disk trending.

10. A system, comprising:
one or more processors configured to:
copy, during a backup of one or more non-volatile information stores of primary storage, metadata of a plurality of files stored in the one or more non-volatile information stores to an index, the metadata copied to the index including at least modification date data of each file of the plurality of files, wherein to perform the backup, the one or more processors are configured to:
identify a first set of one or more files of the plurality of files for a backup operation based at least in part on a determination that the first set of one or more files were modified since a previous backup date, and
perform the backup operation on the first set of one or more files of the plurality of files, wherein the previous backup date indicates a date when modifications to files in the one or more non-volatile information stores were most recently copied to secondary storage;

following the backup operation of the one or more non-volatile information stores, review the metadata copied to the index during the backup to identify a second set of one or more files of the plurality of files that were last modified prior to a system archival date; and perform an archive operation on the second set of one or more files of the plurality of files, wherein the archive operation includes replacing a particular file of the second set of one or more files with an identifier indicating a location of one or more copies of the particular file in the secondary storage.

11. The system of claim 10, wherein the system archival date is based at least in part on at least one of a creation date, last access date, and last modify date of each file.

12. The system of claim 10, wherein the system archival date is based at least in part on an identity of at least one of a user of each file and a creator of each file.

13. The system of claim 10, wherein the system archival date is based at least in part on a rating of each file.

14. The system of claim 10, wherein the one or more processors are further configured to verify the one or more copies of the second set of one or more files are located in the secondary storage prior to performing the archive operation.

15. The system of claim 10, wherein the one or more processors are further configured to identify primary storage usage data of each file of the plurality of files using the metadata copied to the index.

16. The system of claim 15, wherein the primary storage usage data of each file comprises at least file size data, disk type data, and volume type data.

17. The system of claim 15, wherein the one or more processors are further configured to generate a report of the primary storage usage data.

18. The system of claim 17, wherein the report comprises usage trending of the primary storage, fault trending in the primary storage, number of mount points, number of volumes, types of disks in the primary storage, and disk trending.

19. Non-transitory computer readable media comprising computer-executable instructions that, when executed by a computing system, cause the computing system to:

copy, during a backup of one or more non-volatile information stores of primary storage, metadata of a plurality of files stored in the one or more non-volatile information stores to an index, the metadata copied to the index including at least modification date data of each file of the plurality of files, wherein the backup comprises:

identifying a first set of one or more files of the plurality of files for a backup operation based at least in part on a determination that the first set of one or more files were modified since a previous backup date, and performing the backup operation on the first set of one or more files of the plurality of files, wherein the previous backup date indicates a date when modifications to files in the one or more non-volatile information stores were most recently copied to secondary storage;

following the backup operation of the one or more non-volatile information stores, review the metadata copied to the index during the backup to identify a second set of one or more files of the plurality of files that were last modified prior to a system archival date; and perform an archive operation on the second set of one or more files of the plurality of files, wherein the archive operation includes replacing a particular file of the second set of one or more files with an identifier indicating a location of one or more copies of the particular file in the secondary storage.

20. The non-transitory computer readable media of claim 19, wherein the non-transitory computer readable media further cause the computing system to verify the one or more copies of the second set of one or more files are located in the secondary storage prior to performing the archive operation.

* * * * *